United States Patent
Nadeau et al.

(10) Patent No.: US 7,099,947 B1
(45) Date of Patent: Aug. 29, 2006

(54) METHOD AND APPARATUS PROVIDING CONTROLLED ACCESS OF REQUESTS FROM VIRTUAL PRIVATE NETWORK DEVICES TO MANAGED INFORMATION OBJECTS USING SIMPLE NETWORK MANAGEMENT PROTOCOL

(75) Inventors: Thomas D. Nadeau, Hampton, NH (US); Dale Francisco, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 799 days.

(21) Appl. No.: 09/877,548

(22) Filed: Jun. 8, 2001

(51) Int. Cl.
*G06F 15/16* (2006.01)

(52) U.S. Cl. .............. 709/229; 709/244; 709/250; 713/152; 713/171; 715/771; 715/835

(58) Field of Classification Search .......... 709/244, 709/229, 250; 713/132, 171; 715/771, 835
See application file for complete search history.

(56) References Cited

U.S. PATENT DOCUMENTS

| | | | | |
|---|---|---|---|---|
| 6,055,575 A * | 4/2000 | Paulsen et al. | ............. | 709/229 |
| 6,122,639 A * | 9/2000 | Babu et al. | ............. | 707/103 R |
| 6,363,421 B1 * | 3/2002 | Barker et al. | ............. | 709/223 |
| 6,418,472 B1 * | 7/2002 | Mi et al. | ............. | 709/229 |
| 6,421,714 B1 * | 7/2002 | Rai et al. | ............. | 709/217 |
| 6,473,863 B1 * | 10/2002 | Genty et al. | ............. | 713/201 |
| 6,502,135 B1 * | 12/2002 | Munger et al. | ............. | 709/225 |
| 6,529,513 B1 * | 3/2003 | Howard et al. | ............. | 370/401 |
| 6,539,483 B1 * | 3/2003 | Harrison et al. | ............. | 713/201 |
| 6,598,083 B1 * | 7/2003 | Remer et al. | ............. | 709/229 |
| 6,611,863 B1 * | 8/2003 | Banginwar | ............. | 709/220 |
| 6,614,791 B1 * | 9/2003 | Luciani et al. | ............. | 370/395.53 |
| 6,664,978 B1 * | 12/2003 | Kekic et al. | ............. | 345/733 |
| 6,693,878 B1 * | 2/2004 | Daruwalla et al. | ............. | 370/235 |
| 6,765,900 B1 * | 7/2004 | Peirce et al. | ............. | 370/351 |
| 6,772,226 B1 * | 8/2004 | Bommareddy et al. | ..... | 709/245 |
| 6,785,728 B1 * | 8/2004 | Schneider et al. | ............. | 709/229 |
| 6,944,183 B1 * | 9/2005 | Iyer et al. | ............. | 370/466 |
| 2001/0008525 A1 * | 7/2001 | Piepkorn et al. | ............. | 370/352 |

(Continued)

OTHER PUBLICATIONS

Case, J et al., Introduction to Version 3 of the Internet-standard Network Management Framework, RFC 2570, Apr. 1999.*

(Continued)

*Primary Examiner*—Zarni Maung
*Assistant Examiner*—Backhean Tiv
(74) *Attorney, Agent, or Firm*—Hickman Palermo Truong & Becker LLP

(57) ABSTRACT

Access control approaches are disclosed wherein managed object in Simple Network Management Protocol (SNMP) Management Information Bases (MIBs) are accessed on a per-Virtual Private Network (VPN)-basis with no modifications to existing MIBs. A manager and an SNMP Agent operating in a VPN environment agree on a mapping between SNMP securityNames and VPN IDs. Under the agreed mapping, the target VPN of any SNMP management request can be unambiguously determined from the securityName alone. For each securityName, one or more MIB Views are configured using in a View-based Access Control Model MIB (VACM MIB) table; the MIB Views specify which portions of the managed object tree can be viewed or modified by a corresponding VPN. Thereafter, a VPN-enabled device provides SNMP requests in which a VPN ID value is passed in the securityName field of the context string in the community string. The receiving device extracts the securityName, locates corresponding MIB Views using the VACM MIB table, and allows the requesting device to access only objects that are identified in the MIB Views.

30 Claims, 14 Drawing Sheets

U.S. PATENT DOCUMENTS

| | | | |
|---|---|---|---|
| 2001/0012775 A1* | 8/2001 | Modzelesky et al. | 455/427 |
| 2002/0099273 A1* | 7/2002 | Bocionek et al. | 600/300 |
| 2003/0061480 A1* | 3/2003 | Le et al. | 713/153 |

OTHER PUBLICATIONS

Harrington et al., An Architecture for Describing SNMP Management Frameworks, RFC 2571, Apr. 1999.*

Case, J et al., Message Processing and Dispatching for the Simple Network Management Protocol(SNMP), RFC 2572, Apr. 1999.*

Levi, D et al., SNMP Applications, RFC 2573, Apr. 1999.*

Blumenthal U., User-based Security Model (USM) for version 3 of the Simple Network Management Protocol(SNMPv3), RFC 2574, Apr. 1999.*

Wijnen, B., View-based Access Control Model (VACM) for the Simple Network Management Protocol(SNMP), RFC 2575, Apr. 1999.*

B. Wijnen, et al., "View-Based Access Control Model (VACM) for the Simple Network Management Protocol (SNMP)", Apr. 1999, pp. 1-38.

J. Case, et al., "Message Processing and Dispatching for the Simple Network Management Protocol (SNMP)", Apr. 1999, pp. 1-44.

D. Harrington, et al., "An Architecture for Describing SNMP Management Frameworks", Apr. 1999, pp. 1-62.

J. Case, et al., "Introduction to Version 3 of the Internet-standard Network Management Framework", Apr. 1999, pp. 1-23.

* cited by examiner

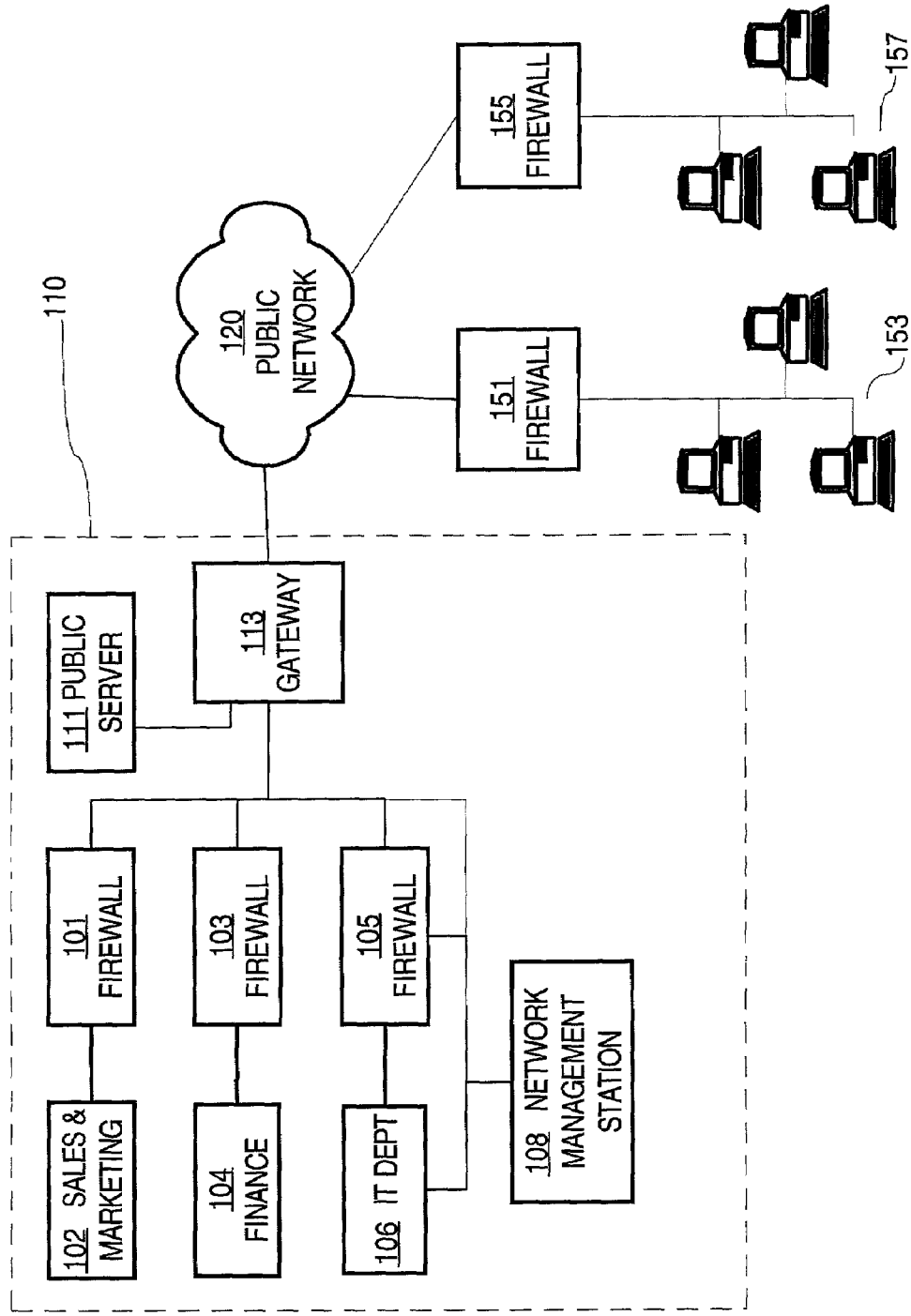

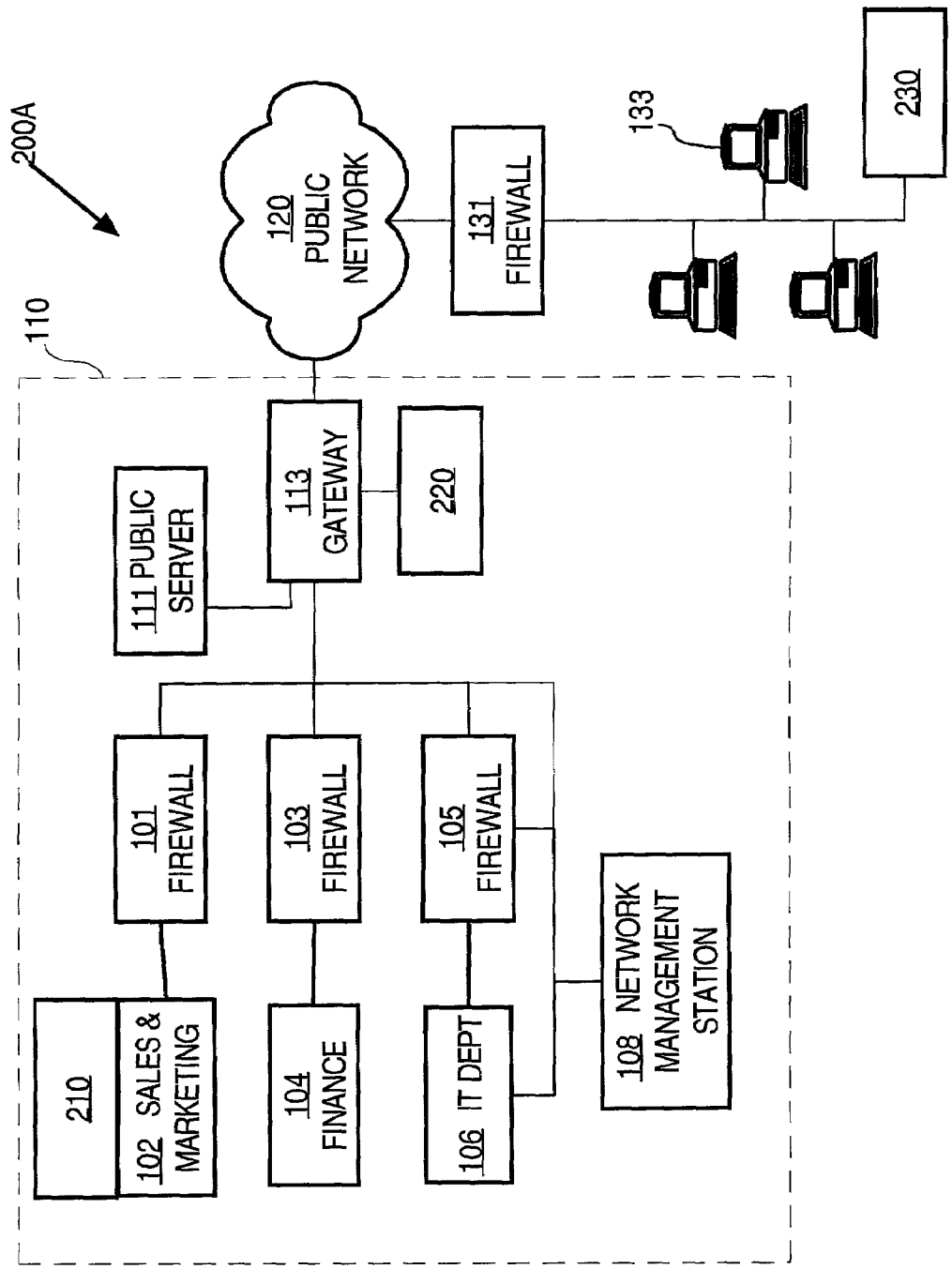

METHOD AND APPARATUS PROVIDING CONTROLLED ACCESS OF REQUESTS FROM VIRTUAL PRIVATE NETWORK DEVICES TO MANAGED INFORMATION OBJECTS USING SIMPLE NETWORK MANAGEMENT PROTOCOL

FIELD OF INVENTION

The present invention generally relates to data packet routing techniques relating to virtual private networks in telecommunications. The invention relates more specifically to providing controlled access of requests from virtual private network devices to managed information objects using The Simple Network Management Protocol (SNMP).

BACKGROUND OF THE INVENTION

A Virtual Private Network (VPN) uses a public network such as the Internet as a transport foundation to establish secure network communication links. VPN technology uses a public network to provide the appearance of a secure network linking business partners, regional and isolated offices of an enterprise, or other users. A VPN can significantly decrease the cost of providing secure communications among a mobile workforce, or when providing virtual network services which mimic leased-line private access to customers. The effects of VPNs on organizations employing them have been dramatic: sales have been increased; product development has been accelerated; and strategic partnerships have been strengthened in ways never before possible. Since network access is generally available locally, VPNs offer a less expensive alternative to dedicated remote access connections.

The details of VPN implementations are beyond the scope of this disclosure. In general, a VPN is implemented by communicatively coupling a plurality of routers, switches, gateways, and firewalls in one or more local area networks, wide area networks, or internetworks. End stations such as personal computers, workstations, servers, printers, and IP phones are communicatively coupled to the network devices. Although the internetwork infrastructure is public, the end stations are generally associated with one or more unrelated organizations. To prevent a second organization from receiving and using information transmitted from a first organization, a router at an edge of the first organization's network typically encrypts and specially treats outbound requests. The outbound requests then pass through devices within the network and through any related networks as if they were normal (non-VPN) traffic. Requests can enter a particular destination local area network only if the VPN traffic is associated with that destination network. If not, the request is recognized as outside the VPN and blocked (dropped).

The Simple Network Management Protocol (SNMP) is a well-known application-layer protocol that facilitates exchange of management information between Managed Devices. Using SNMP-transported data referred to as objects (such as packets per second and network error rates), network administrators can more easily manage network performance, configure and provision network devices, find and solve network problems, and plan for network growth. A manager with a Network Management Station will use SNMP, to retrieve or modify information about the status or which is part of the configuration of the network device.

SNMP is defined in multiple versions known as Version 1 (abbreviated herein as "SNMPv1"); Version 2 ("SNMPv2"); Community-based SNMP Version 2 ("SNMPv2c"); and Version 3 ("SNMPv3"). All versions share the same basic structure, components, and architecture. In general, information in an SNMP-enabled device is stored in the form of a plurality of Managed Objects that are arranged in an object tree. Each object has one or more corresponding object instances, each of which has a unique object identifier ("OID"). Values of object instances are stored in tables in device memory; the names of the tables correspond to the names of the Managed Objects. Network Management Stations also keep track of the names of tables and their corresponding OIDs in anticipation of the time when they will issue requests for those OIDs to the SNMP-enabled device.

SNMPv3 defines an extensible framework that supports a new SNMP message format; security for messages; certain forms of access control; and remote configuration of SNMP parameters. In SNMPv3, application entities and protocol entities are called applications and engines, respectively. SNMPv3 also defines a security capability referred to as privacy. The modular nature of SNMPv3 also permits both changes and additions to the security capabilities. SNMPv3 is described in Internet Request for Comments ("RFC") 2570, RFC 2571, RFC 2572 and RFC 2575.

The SNMPv3 framework also specifies a concept fundamentally similar to a SNMP MIB view called a View-based Access Control Model (VACM). A VACM provides a means for controlling access to information on managed devices.

SNMPv3 also defines a principal; a model-independent principal identifier value that can identify principals for access control purposes ("securityName"); and a model-dependent security ID. A principal is the entity on whose behalf services are provided, or for which processing takes place. A principal may be, for example, an individual acting in a particular role; a set of individuals, each acting in a particular role; an application or a set of applications; and combinations thereof.

A securityName is a human-readable string value that represents a principal. The data format of the securityName is defined as model-independent. In this context, "model independent" means that the format of a securityName is not tied to a specific object model or data model that supports communication security, and can be used with many security data models that interoperate with other SNMP applications.

In contrast, the model-dependent security ID is a model-specific representation of a securityName within a particular security model that is in use at a particular device. Model-dependent security IDs may or may not be human-readable, and have a model-dependent syntax. Examples of model-dependent security IDs include community names and user names. The transformation of model-dependent security IDs into securityNames, and the converse, is carried out by the relevant security model.

All versions of SNMP define a request/response protocol. A network management station ("NMS") can send multiple requests without receiving a response. Six SNMP operations are defined: Get; GetNext; GetBulk; Set; Notification; and Inform.

An SNMP entity such as an NMS issues a Get request to retrieve a specific Object Instance from an SNMP Agent of a Managed Device. A GetNext request is used to retrieve the next lexically greater Object Instance from MIB table associated with a Managed Device or its SNMP Agent. A GetBulk request, which first became available in SNMPv2, is used to retrieve large amounts of related information without repeated GetNext requests.

A Set request is issued to set values for specific Object Instances that are managed by an SNMP Agent. The Notification request is used by the SNMP Agent to asynchronously notify the manager of some event. The delivery of this message is not guaranteed; that is, it is unreliably transferred to the manager from the agent. The Notification request is used by the SNMP Agent to asynchronously inform the manager of some event in a reliable fashion. That is, the delivery of an Inform Request to a specific manager is guaranteed.

Given the rise in popularity of both VPNs and SNMP, there is a growing demand for the ability to manage Managed Devices in a VPN environment using SNMP. However, a particular VPN may contain information that should be kept private from users of other VPNs supported on a particular device as well as other non-authorized users that have access to that network. Unfortunately, SNMP does not inherently provide a means to distinguish MIB objects associated with one VPN from MIB objects of another VPN. Consequently, there is presently no workable way to assure user privacy.

Others have proposed approaches to use SNMP to manage VPNs, and still assure user privacy. However, these approaches typically involve explicitly adding VPN identifiers as columnar objects to existing MIBs. Therefore, these approaches require modification of both standard and proprietary MIBs, which is undesirable because it may require modification of other existing software, including all existing implementations of MIBs. Furthermore, modification of standard MIBs is not possible, simply because they must be implement as-is in order to conform to the standard. Consequently, these prior art approaches are either impossible or are not scalable. In particular, under these approaches, every MIB that needs to be "VPN aware" has to be modified. In addition, introduction of new tunneling or multiplexing schemes to support different types of VPN operations may require further modification of various objects, further compounding the scalability issue.

Other past approaches have required significant modification to existing SNMP Agent code and/or to existing MIBs for each new VPN technology supported. These approaches typically required modification of the SNMP Agent's underlying code. This code is present in a particular network device that retrieves or modifies the actual values represented by SNMP objects (the "instrumentation"). This code was modified to add a VPN identifier for use in lookup routines for each VPN multiplexing scheme supported. These modifications involved messy and error-prone changes to the basic Get, Set, and GetNext methods in every affected MIB. These modifications also sometimes required illegal modification to the standard MIB text.

The foregoing problems have made such past approaches inconsistent, and resulted in an incoherent access policy for VPN management within system devices. Most companies ultimately employed one or more "hacked" methods for special cases within their systems and there was no consistent company, not to mention industry wide, method for providing management of VPNs.

Based on the foregoing, there is a clear need for a simple and elegant approach to allow the use of SNMP to manage VPNs which provides user privacy, and constrained and secure access to managed devices simultaneously.

In particular, there is a need for a way to ensure that a particular SNMP MIB in part or in its entirety, is accessible only by devices that are participating in a VPN that is associated with that MIB.

There is also a need for an approach that has minimal or no impact on existing SNMP network management systems. Similarly, there is a need for an approach that has little or no impact on SNMP Agent software development. In particular, there is a need for an approach that requires no modifications to existing MIBs.

SUMMARY OF THE INVENTION

The foregoing needs, and other needs and objects that will become apparent for the following description, are achieved in the present invention, which comprises, in one aspect, a method of controlling access of network management requests directed to one or more network devices that participate in a virtual private network. In this aspect, a request to carry out a management protocol operation is received. An identifier of a virtual private network in the request is determined. If a match between the VPN associated with the specified subset of objects among a plurality of managed objects is made with the VPN identifier, then the request it permitted access. The request is provided with access to only the subset of objects.

In another aspect, the invention provides a method and apparatus providing a virtual private network using the simple network management protocol, in which managed objects in Simple Network Management Protocol (SNMP) Management Information Bases (MIBs) are accessed on a per-Virtual Private Network (VPN)-basis with no modifications to existing MIBs or SNMP Agent code. A manager and an SNMP Agent operating in a VPN environment agree on a mapping between SNMP securityNames and VPN IDs. Under the agreed mapping, the target VPN of any SNMP management request can be unambiguously determined from the securityName alone. For each securityName, one or more MIB Views are configured using a View-based Access Control Model MIB (VACM MIB) table; the MIB Views specify which portions of the managed object tree can be viewed or modified by a corresponding VPN. Thereafter, a VPN-enabled device provides SNMP requests in which a VPN ID value is passed in the securityName field of the context string in the community string. The receiving device extracts the securityName, locates corresponding MIB Views using the VACM MIB table, and allows the requesting device to access only objects that are identified in the MIB Views.

The approaches described herein solve the problem of accessing SNMP MIBs on a per-VPN-basis; yet require no modifications to existing MIBs. Using the approaches described herein, access to information for a specific VPN is restricted to a subset of Object Instances in the OID tree. Consequently, a particular VPN is prevented from accessing information belonging to other VPNs.

The approaches described herein are based on existing security and access control mechanisms of SNMP, and are simple and scalable. The approaches described herein are configured to support all future types of VPN technologies, regardless of how they partition Object Instances. In particular, the approaches described herein do not determine and do not need to know which specific type of VPN is supported. Therefore, since current and foreseeable VPN technologies involve further partitioning of Object Instances, whatever partitioning is decided upon, the approaches herein will facilitate it.

The approaches herein may be readily adapted to support a new VPN technology by appropriate modifications to a function that cause the function to fetch the appropriate table to act upon in the manner described above.

The approaches described herein can be used to allow one VPN to access several other VPNs in an administrative or hierarchical role.

In other aspects, the invention encompasses a computer apparatus, a computer readable medium, and a carrier wave configured to carry out the foregoing steps.

BRIEF DESCRIPTION OF THE DRAWINGS

The present invention is illustrated by way of example, and not by way of limitation, in the figures of the accompanying drawings and in which like reference numerals refer to similar elements and in which:

FIG. 1C is a simplified block diagram of an extranet Virtual Private Network;

FIG. 2A is simplified block diagram of an intranet Virtual Private Network that includes Managed Devices;

DETAILED DESCRIPTION OF THE PREFERRED EMBODIMENT

A method and apparatus providing a virtual private network using simple network management protocol is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein in sections according to the following outline:

1.0 OPERATIONAL CONTEXT
  1.1 Virtual Private Networks
  1.2 Network Device Elements Relating To SNMP
2.0 APPROACH FOR ACCESSING SNMP MIBS WITH VPN ACCESS CONTROL
  2.1 General Functional Overview
  2.2 Using MIB Views For Security Purposes
  2.3 Configuration Of NMS With Mapping Of Security Names To VPN Identifiers And To Generate Requests With VPN ID's
  2.4 Selecting MIB Views Based On Security Names
  2.5 Processing Information Relating To Meta-VPNs
  2.6 Extensions And Alternatives Of The Approaches
3.0 HARDWARE OVERVIEW
4.0 DISCLOSURE IS AN EXAMPLE 1.0 Operational Context 1.1 Virtual Private Networks In general, VPN implementations can be grouped into three primary categories: intranet VPNs; remote access VPNs; and extranet VPNs. In addition, a given VPN deployment can include any combination of these three groupings. For purposes of illustrating example contexts in which embodiments may be used, simplified examples of each of the categories of VPNs are now described. Embodiments of the approaches described herein are applicable to all such VPN implementations and any other VPN implementation that is later discovered.

Figure 1A:
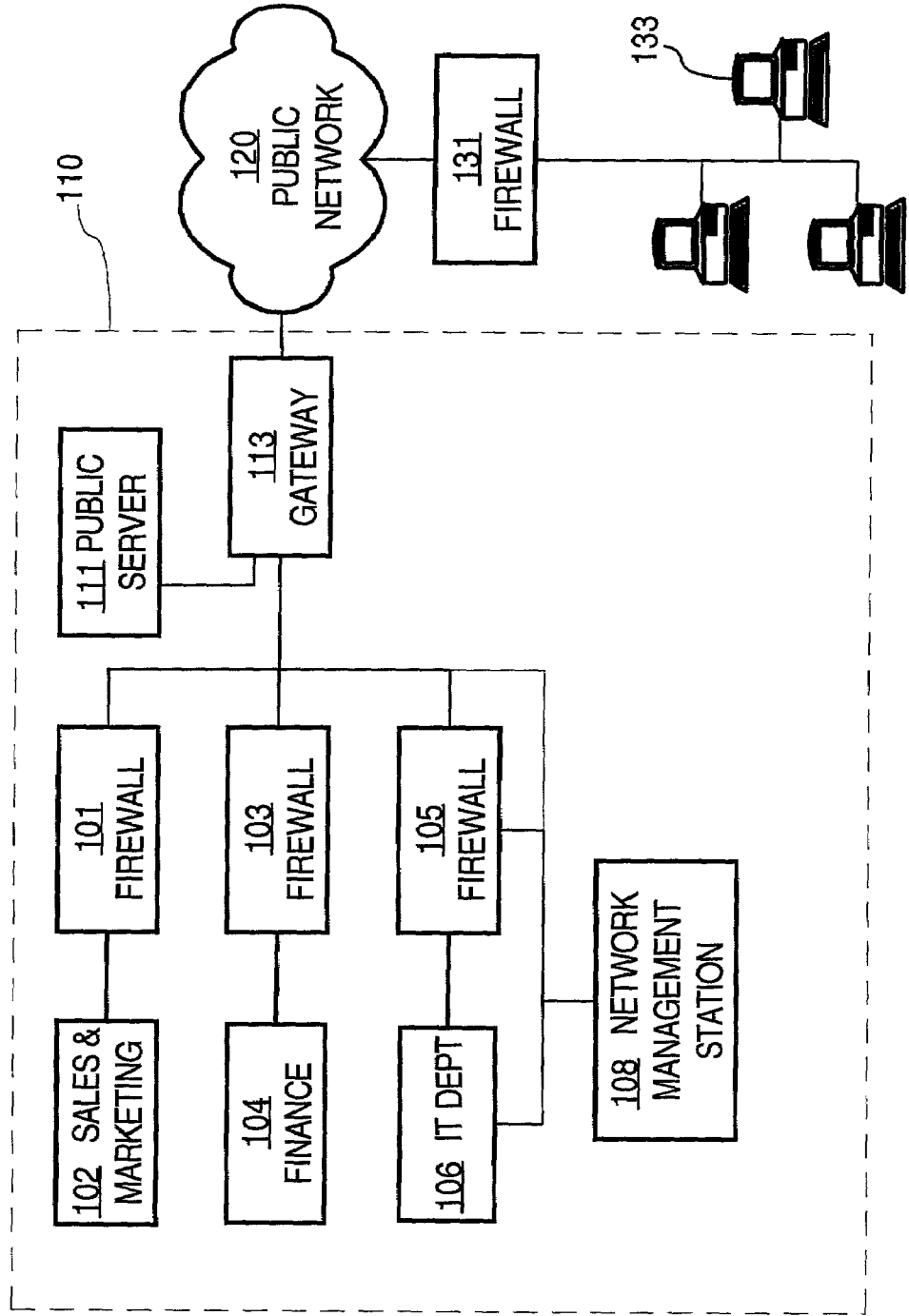
FIG. 1A is a simplified block diagram of an intranet Virtual Private Network.

FIG. 1A is a simplified block diagram of an intranet VPN 100A that facilitates secure communications between a corporation's local area network (LAN) 110 and its branch offices 133.

LAN 110 includes departmental networks/computers 102, 104, 106. For purposes of illustrating a simple example, in FIG. 1A, networks/computers 102, 104, 106 are associated with "Sales & Marketing", "Finance" and "IT" organizations, respectively. Departmental networks/computers 102, 104, 106 are protected by departmental firewalls 101, 103, 105, respectively. Departmental firewalls 101, 103, 105 prevent unauthorized access to departmental networks/computers 102, 104, 106, respectively.

A Network Management Station 108 (NMS 108, "manager", "management console") is communicatively coupled to departmental networks/computers 102, 104, 106. NMS 108 is used by an administrator or technician to monitor and control devices on networks.

LAN 110 also includes a public server 111 that is coupled to gateway 113 and is logically located outside firewalls 101, 103, 105. Public server 111 provides e-mail, Word Wide Web services, file transfer services and various other services and information to parties outside and inside LAN 110. Gateway 113 provides an interface and firewall between LAN 110 and a public network 120. Network 120 provides a transport foundation for intranet VPN 100A. Using network 120, LAN 110 is communicatively coupled to the outside world. In this example, network 120 connects LAN 110 to remote site 133 through remote site firewall 131. In this configuration, public server 111 is protected by one level of firewall, i.e., gateway 113, whereas departmental networks/computers 102, 104, 106 are protected by two firewall levels consisting of gateway 113 and firewalls 101, 103, 105.

Figure 1B:
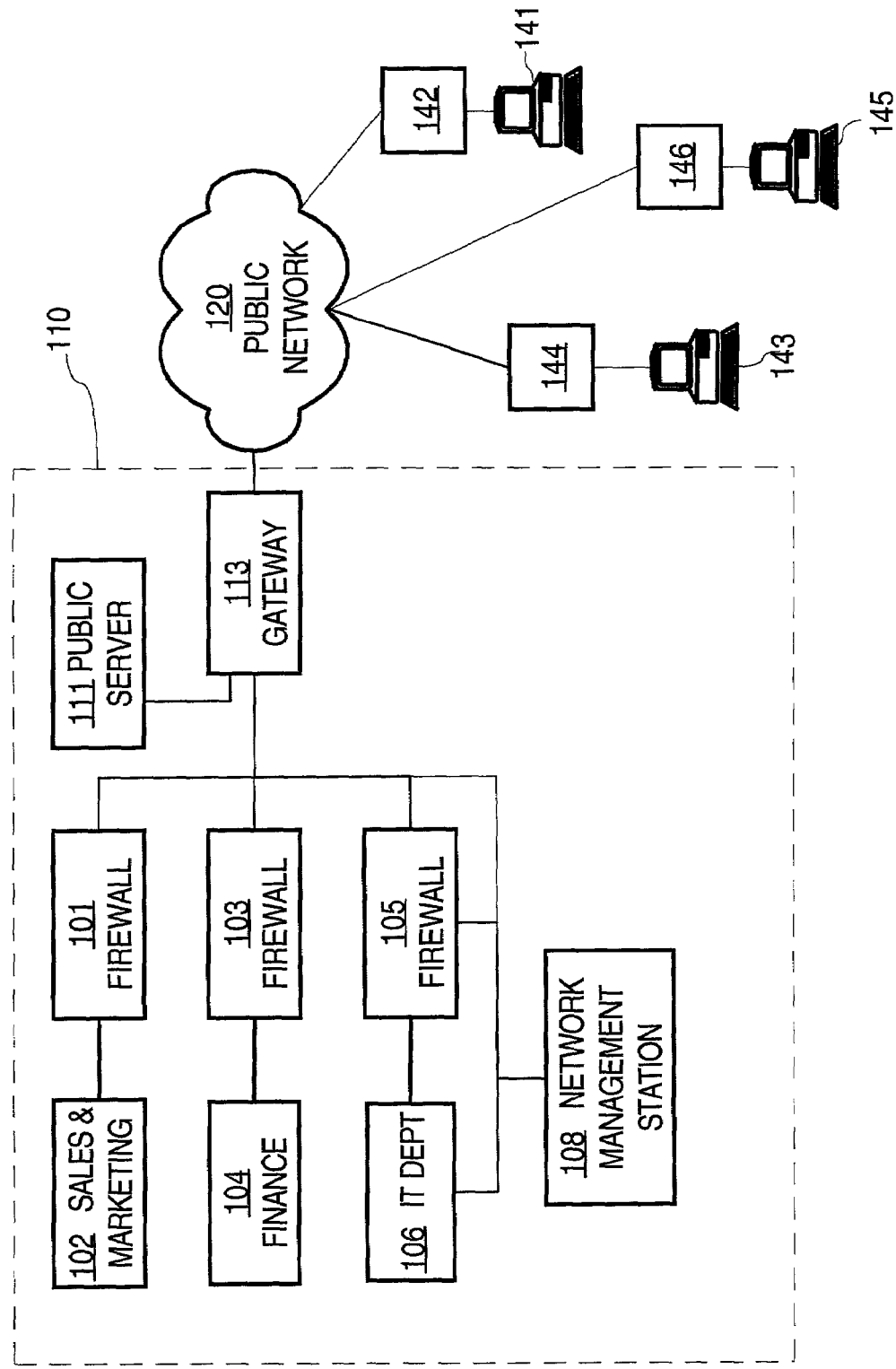
FIG. 1B is a simplified block diagram of a remote access Virtual Private Network.

FIG. 1B is a simplified block diagram of a remote access VPN 100B connecting LAN 110 and remote and/or mobile employees 141, 143, 145.

Remote access VPN 100B includes LAN 110 that comprises one or more departmental networks/computers 102, 104, 106 that are protected by departmental firewalls 101, 103, 105. Remote access VPN 100B includes NMS 108 that is communicatively coupled to departmental networks/computers 102, 104 and 106. Remote access VPN 100B also includes public server 111 that is communicatively coupled to Gateway 113 and Network 120. In this example, Network 120 connects LAN 110 to remote and/or mobile employees 141, 143, 145. Remote and/or mobile employees 141, 143, 145 are given access to LAN 110 through encryption/authentication keys 142, 144 and 146, respectively.

Remote accesses VPNs have different requirements than intranet VPNs. Using a remote access VPN, strong authentication is critical to verify the identities of remote and mobile users in the most accurate and efficient manner possible. With respect to management, remote access VPNs require centralized management and a high degree of scalability to handle the vast number of users accessing the VPN.

FIG. 1C is a simplified block diagram representation of an extranet VPN 100C connecting LAN 110 and a corporation's strategic partners, customers and/or suppliers 153, 157.

Extranet VPN 100C includes a LAN 110 made up of departmental networks/computers 102, 104, 106 that are protected by departmental firewalls 101, 103, 105, respectively. Extranet VPN 100C also includes NMS 108 that is communicatively coupled to departmental networks/computers 102, 104 and 106. Extranet VPN 100C also includes public server 111 that is communicatively coupled to Gateway 113 and Network 120. Network 120 also is communicatively coupled by LAN 110 to the corporation's strategic partners, customers and/or suppliers 153, 157 through firewalls 151, 155.

Extranet VPNs require an open, standards-based solution to ensure interoperability with the various solutions that the business partners might implement. In addition, extranet VPNs require strong authentication to verify remote users' identities in the most accurate and efficient manner possible.

Figure 1D:
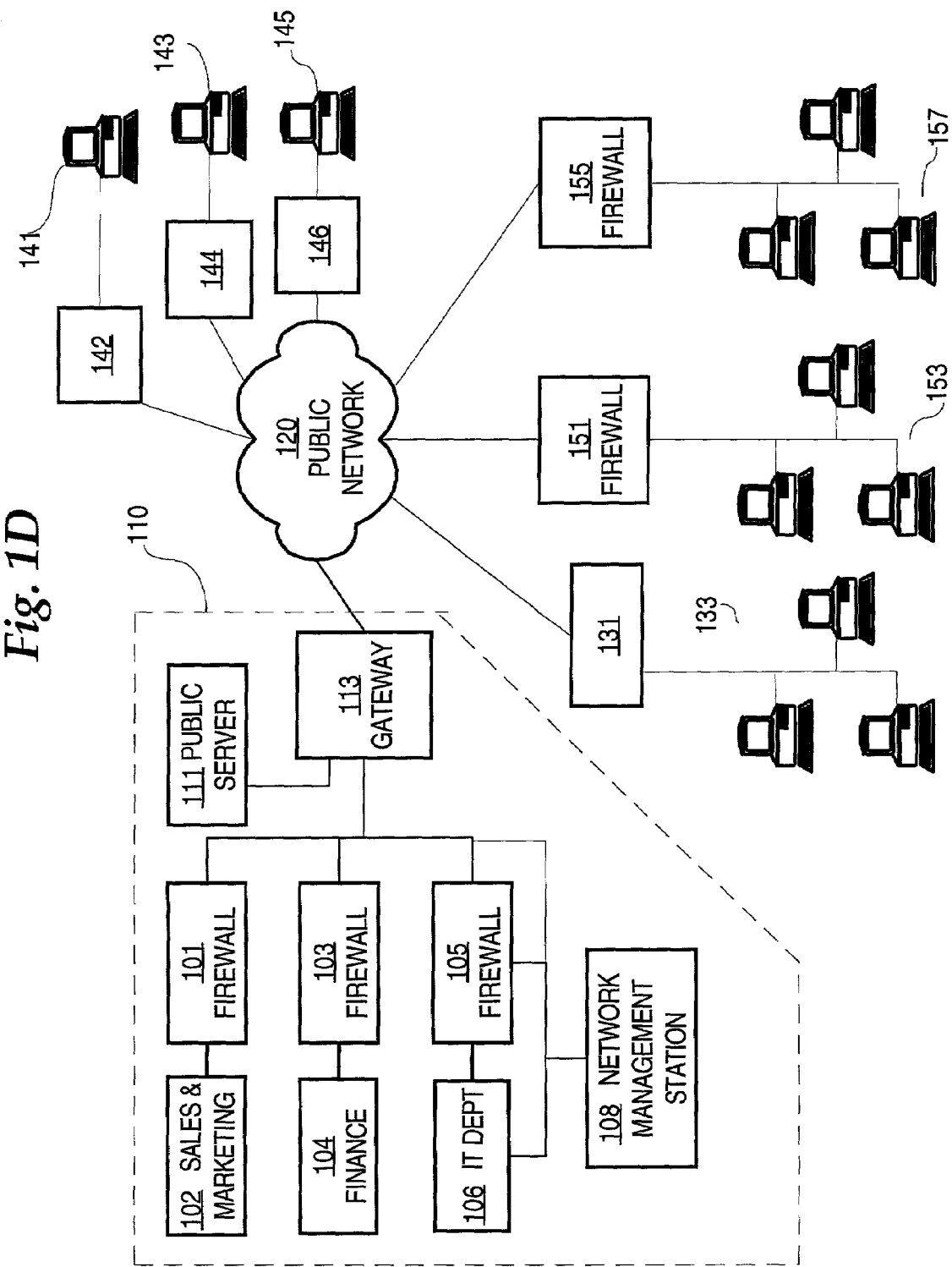
FIG. 1D is a simplified block diagram of a combination Virtual Private Network.

FIG. 1D is a simplified block diagram of a VPN that includes elements of intranet VPN 100A, remote access VPN 100B and extranet VPN 100C in one combination VPN 100D.

Combination VPN 100D includes a LAN 110 made up of departmental networks/computers 102, 104, 106 that are protected by departmental firewalls 101, 103, 105, respectively. Combination VPN 100D also includes NMS 108 that is communicatively coupled to departmental networks/computers 102, 104 and 106. Combination VPN 100D also includes public server 111 that is communicatively coupled to Gateway 113 and Network 120. Network 120 connects LAN 110 to remote site 133 through remote site firewall 131; to remote and/or mobile employees 141, 143 and 145 through encryption keys 142, 144, 146, respectively; and to the strategic partners, customers and/or suppliers 153, 157 through firewalls 151, 155.

Each of the foregoing VPN implementations may use a network management system. A typical network management system comprises: Managed Devices; Agents; Managed Objects; Management Information Bases; Managers, such as Network Management Stations; and Management Protocols. In this context, Managed Devices are hardware devices such as computers, routers, terminal servers, printers or any other devices that are connected to networks. Managed Devices are also referred to as "Network Elements".

Agents are software modules that reside in and are executed by Managed Devices. Agents collect and store management information such as the number of error packets received by a Managed Device.

A Managed Object is a characteristic of something that can be managed. It is important to note the distinction between Managed Objects and Object Instances. Managed Objects are sets of particular types of Object Instances, although the set can include zero or only one Object Instance. On the other hand, Object Instances are variables related to a single, particular, device. For example, a list of currently active TCP circuits in a particular host computer is a Managed Object while a single active TCP circuit in a particular host computer would be an Object Instance. Managed Objects can be scalar (defining a single object instance) or tabular (defining multiple, related instances).

A Management Information Base (MIB) is a collection of Managed Objects residing in a virtual information store. Collections of related Managed Objects are defined in specific MIB modules.

Managers are typically NMSs that execute management applications that monitor and control Managed Devices. NMSs may be workstations or similar computers. At least one manager, such as a NMS, must be present in each managed environment.

A Management Protocol is used to convey management information between Agents and NMSs. An example of a Management Protocol is Simple Network Management Protocol (SNMP).

SNMPv1 is described in Request For Comment ("RFC") 1155, RFC 1157, and RFC 1212. In SNMPv1, messages comprise Protocol Data Units (PDUs). Messages are communicated between SNMP entities, and such entities may comprise application entities and protocol entities. SNMPv1 also includes an authentication service supporting one or more authentication schemes. SNMPv1 further defines access control techniques based on a SNMP MIB View. One drawback of SNMPv1 is that it does not define any authentication techniques other than a trivial authentication scheme based on community strings.

SNMPv2 is derived from SNMPv1 and is described in RFC 2578, RFC 2579, RFC 2580, RFC 1905, RFC 1906, and RFC 1907. SNMPv2 has no message definition. SNMPv2 defines increased security capabilities, but these security capabilities still have weaknesses. Although SNMPv2 has been popular and widely adopted, a need for increased security capabilities has remained a drawback of it.

Community-Based SNMP Version 2 (SNMPv2c) is described in RFC 1901. SNMPv2c has a message format that is similar to the SNMPv1 message format. SNMPv3 is described above.

FIG. 2A is a simplified block diagram of an intranet VPN having Managed Devices.

In the example of FIG. 2A, Intranet VPN 200A comprises one or more Managed Devices 210, 220, 230. Intranet VPN 200A further comprises a LAN 110 with departmental networks/computers 102, 104, 106 and departmental networks/computers 102, 104, 106 are protected by departmental firewalls 101, 103, 105, respectively. Departmental network/computer 102 may include one or more Managed Devices 210, each of which may be any hardware device that is communicatively coupled to departmental network/computer 102. LAN 110 also includes NMS 108 that is communicatively coupled to firewall 105 and departmental networks/computers 102, 104, 106.

LAN network 110 may also include a public server 111 that is coupled to Gateway 113. As discussed above, Gateway 113 is a firewall between LAN 110 and the Network 120 and, in this example, includes one or more managed devices, represented by Managed Device 220 that is communicatively coupled to Gateway 113. In one embodiment, Managed Device 220 is a router.

In VPN 200A, Network 120 communicatively couples LAN 110 to remote site 133 through remote site firewall 131. In this example, remote site 133 includes one or more Managed Devices 230.

Figure 2B:
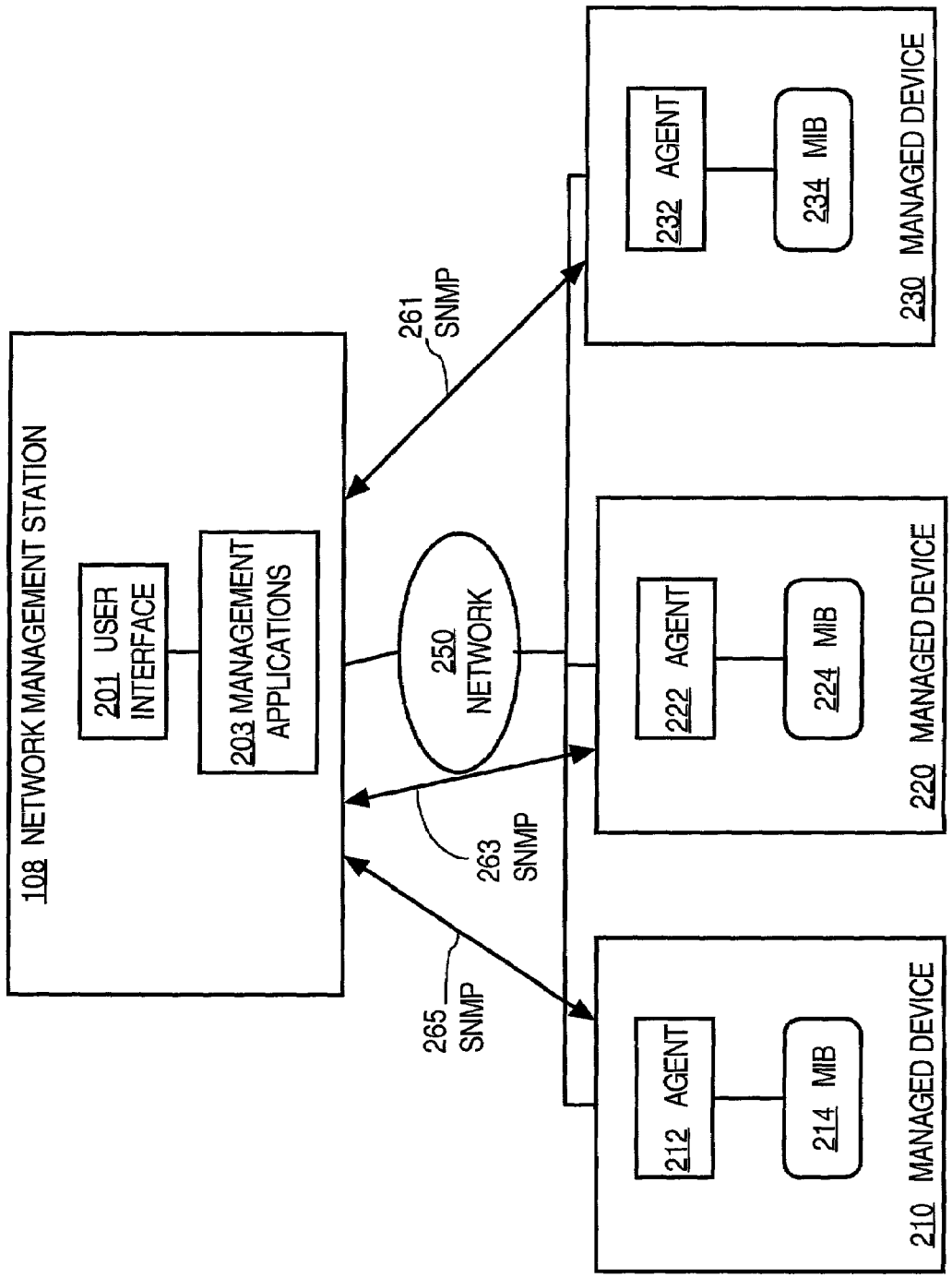
FIG. 2B is a simplified block diagram of a logical relationship of a network management station and managed devices.

FIG. 2B is a simplified block diagram of a logical relationship of a network management station to managed devices. For purposes of illustrating an example, FIG. 2B is described herein in the context of intranet VPN 200A. However, embodiments are not limited to this context.

In FIG. 2B, NMS 108 includes a user interface 201 and a Management Application 203. User interface 201 comprises one or more software elements that interface Management Application 203 to a network administrator, or other NMS operator, for the purpose of facilitating interaction with Managed Devices 210, 220 and 230.

Management Application 203 communicates and collects information from Agents 212, 222, 232 that reside, and report on, Managed Devices 210, 220, 230, respectively. Agents 212, 222, 232 typically communicate with NMS 108 using SNMP over either a direct line, such as lines 261, 263, 265, or a network 250. Agents 212, 222, 232 collect information on managed devices 210, 220, 230 from MIBs 214, 224, 234, respectively, of Managed Devices 210, 220, 230, respectively.

Each MIB comprises one or more Managed Objects residing in a virtual information store; related Managed Objects are defined in specific MIB modules. MIB modules may contain object definitions, definitions of event notifications, and compliance statements specified in terms of appropriate object and event notification groups. As such, MIB modules define the management information maintained in Managed Devices 210, 220, 230, made remotely accessible by Agents 212, 222, 232, conveyed by a Management Protocol such as SNMP, and manipulated by Management Applications such as Management Application 203.

A MIB may be represented as an abstract tree with an unnamed root. Individual data items make up the leaves of the tree. Object Identifiers (OIDs) uniquely identify or name MIB objects in the tree, and are organized hierarchically with specific digits assigned by different organizations. Numerous standards-based MIB modules are known, having several thousand defined objects. The objects are grouped by protocol including: the Transmission Control Protocol (TCP); the Network Protocol (IP); the User Datagram Protocol (UDP); and SNMP; and other categories, including "system" and "interfaces."

The MIB tree is also extensible by virtue of experimental, proprietary and/or private branches. There are now more of these enterprise-specific proprietary MIB modules, defined unilaterally by various vendors and other groups, than standards-based MIB modules. Consequently, there are now a virtually uncountable number of defined objects.

1.2 Network Device Elements Relating to SNMP

The functions and organization of software elements for implementing SNMPv3 in a network device are described in RFC 2570, RFC 2571 and RFC 2572. Familiarity with such documents is assumed, and accordingly, in the description herein, only portions of the SNMPv3 architecture relevant to the invention are described.

An SNMP entity is an implementation of the general SNMP architecture. Each SNMP entity comprises an SNMP engine and one or more associated software applications.

Figure 3:
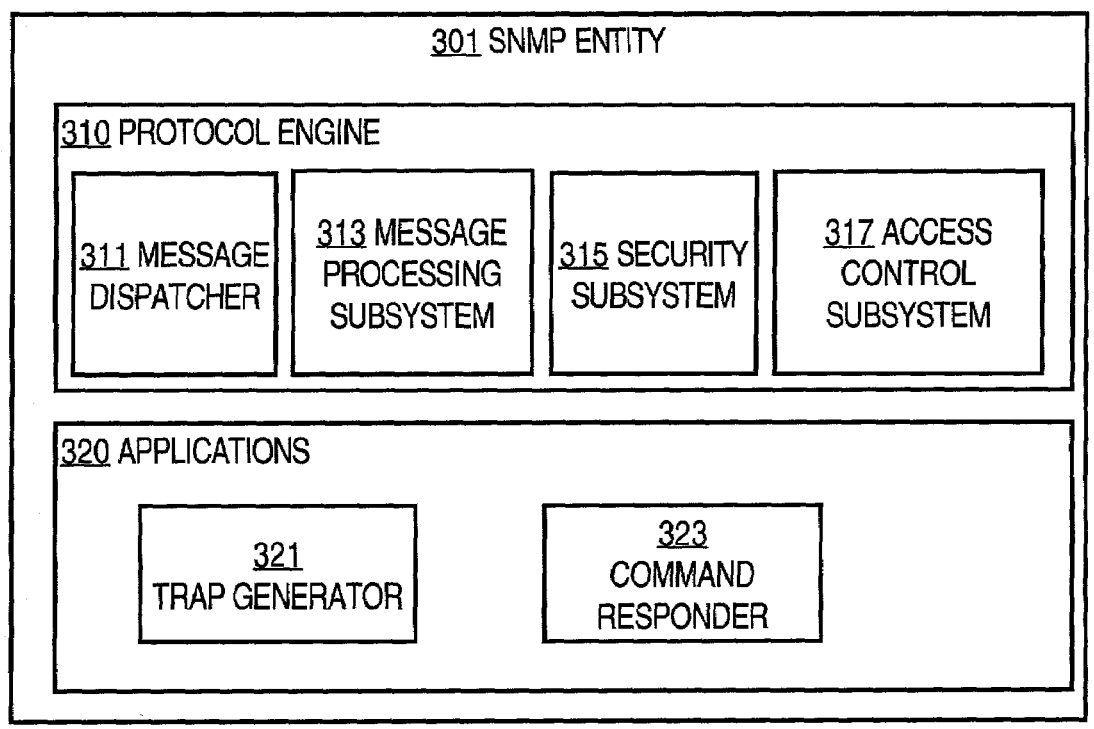
FIG. 3 is a block diagram of an example SNMP entity.

FIG. 3 is a block diagram of an example SNMP entity.

SNMP entity 301 generally comprises a protocol engine 310 and applications 320. Protocol engine 310 comprises a message dispatcher 311, a message processing subsystem 313, a security subsystem 315, and an access control subsystem 317. Applications 320 may include any other desired applications for carrying out various processing functions. When SNMP entity 301 is acting as an SNMP Agent, its primary applications are a trap generator (or "notification originator") 321 and command responder 323.

Within protocol engine 310, message dispatcher subsystem 311 distributes SNMP PDUs to the MIB instrumentation. Message processing subsystem 313 extracts information from received SNMP messages and prepares messages for transmission. Security subsystem 315 provides services such as message authentication and encryption. Using the approaches described herein in more detail, access control subsystem 317 uses an access control model, such as the View-Based Access Control Model (VACM) and information provided to it by the security subsystem 315 (such as a user's securityName) to determine whether particular SNMP operations are authorized with respect to particular managed objects.

Command responder 323 responds to SNMP commands, e.g., Get, GetNext, etc., by exchanging PDUs between message dispatcher 311 and underlying MIB instrumentation 325. Notification originator or trap generator 321 generates asynchronous messages, i.e., traps or informs, for sending to a management entity such as a NMS.

An SNMP entity may be implemented as an SNMP Agent in two general ways. In a Monolithic SNMP Agent, protocol engine 310, applications 321, 323, and MIB instrumentation 325 are tightly coupled at compile time. This allows for relatively efficient management request processing, but requires a static set of Managed Objects. In particular, all of the Managed Objects must be known to the SNMP Agent in advance. In a Distributed SNMP Agent system, a master SNMP Agent provides all the services of protocol engine 310, but command dispatching is processed in a different manner. Instead of communicating SNMP commands directly to command responder application 323, the master SNMP Agent encapsulates such commands in a Distributed SNMP Agent protocol message (e.g., "AgentX, EMANATE") and dispatches such commands to sub-agents for actual processing. Each sub-agent registers with the master SNMP Agent at initialization time and informs the master SNMP Agent what Managed Objects are its responsibility. This implementation provides dynamic registration of Managed Objects at the cost of increased message processing overhead.

However, embodiments described herein only require use of security subsystem 315 and access control subsystem 317, and do not directly depend upon command dispatching functions. Consequently, embodiments described herein are equally effective when used with Monolithic SNMP Agent and Distributed SNMP Agent implementations.

2.0 Approaches for Accessing SNMP MIBS with VPN Access Control 2.1 General Functional Overview In general, in one embodiment, the approaches described herein solve the problem of accessing SNMP MIBs on a per-VPN-basis, without modifications to existing MIBs.

In one specific approach, a NMS, or other manager, and an SNMP agent operating in a VPN environment agree on a mapping between SNMP securityNames and VPN identifiers, such that the VPN associated with any SNMP request is unambiguously designated by a particular securityName. The VACM of SNMPv3 is used to create and store one or more associations of groups, which comprise zero or more securityNames, to MIB Views appropriate for operations such as read, write, and notify. When an SNMP agent receives an SNMP request, the agent extracts the securityName from the request. Based on the VACM associations, the agent then maps the securityName value to a pre-configured SNMP MIB View that implements an access policy for the associated VPN ID. The access policy is presumed to restrict requests for the identified VPN to the appropriate subset of the SNMP agent's managed object tree.

In one embodiment, the foregoing approach is used to restrict access only to groups of MIB objects, and not to particular instances of such objects. Alternatively, access to particular instances of objects may be restricted.

In an alternative approach, a VPN ID is transmitted as the SNMP Context Field for every request destined for a particular VPN.

In another alternative approach, applicable to SNMPv2, the mapping may be established by configuring the mapping in a MIB View that contains the access policy for the VPN ID.

In one specific approach, the access policy instructs the SNMP Dispatcher to restrict requests for the particular VPN such that the requesting entity is only allowed access to a subset of the MIB object tree.

In an alternative embodiment applicable to SNMPv2, operations in which an SNMP Agent must explicitly know whether a particular request is associated with a particular VPN can be accommodated by providing a VPN ID as part of the SNMP Community String. Since the SNMPv2 framework provides Community Strings to all SNMP Agents in an unaltered form, SNMP Agents that need VPN ID information can receive it as necessary through the SNMP Community String.

According to another aspect, an approach is provided to allow one VPN to access several other VPNs in an administrative or hierarchical role. For example, an entity such as a network service provider that provides VPN services to different customers can have administrative access over all such VPNs.

According to another feature, SNMP trap or inform requests each include a VPN ID value. As a result, an NMS receiving such requests can determine a particular VPN from which the trap originated. In one approach, the VPN ID is placed in an SNMP Community Strings when a trap or inform request is created. Since a Community String is a mandatory part of a trap request under SNMP, and because SNMP always conveys a Community String to a receiving agent, VPN ID information is automatically communicated on a per-VPN basis using the approach herein. The approach assumes, however, that the SNMP Agent includes logic that can selectively route a received trap request to one or more trap receiver routines based on the VPN ID.

Consequently, a request associated with one particular VPN cannot obtain information that is associated with another VPN. Further, because MIB object instances associated with a particular VPN provide appropriate access information in the form of a securityName, object instances may be created, deleted or modified on a per-VPN basis, without requiring the instrumentation to determine whether a particular Object Instance resides within a particular VPN. In addition, SNMP Agents and their MIBs can become "VPN aware" without modification to the SNMP Agent code or the MIBs.

Figure 4A:
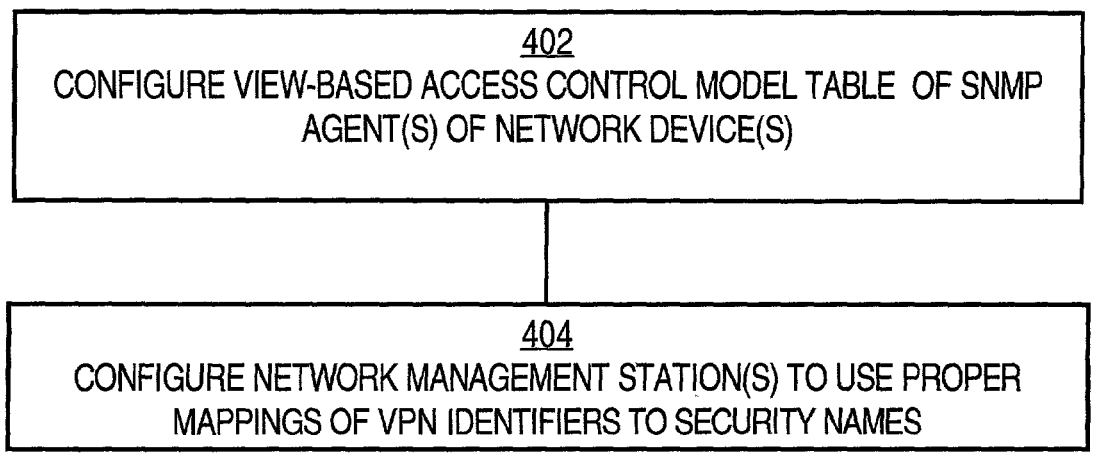
FIG. 4A is a flow diagram of a process of configuration.
Figure 4B:
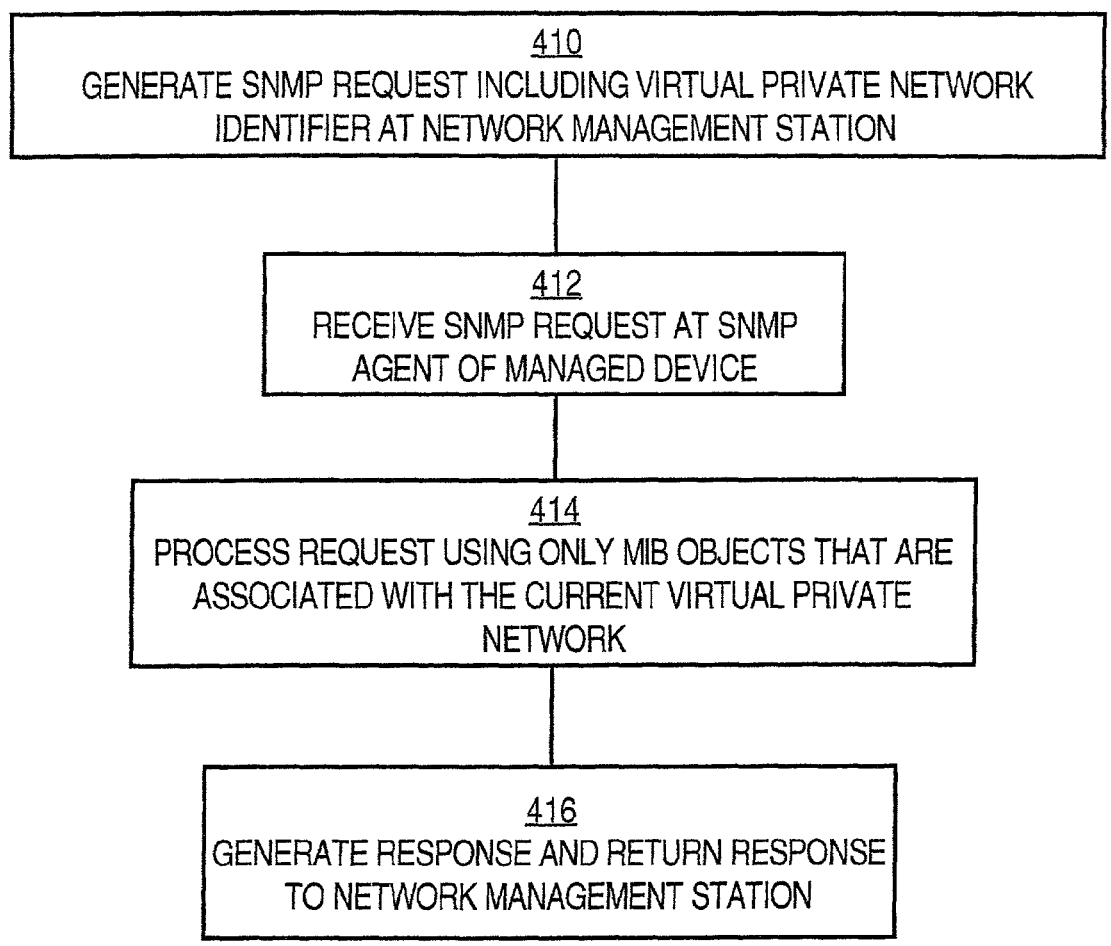
FIG. 4B is a flow diagram of a process of generating and processing SNMP requests that are subject to VPN access control.

FIG. 4A and FIG. 4B are flow diagrams that provide an overview of processes involved in an embodiment.

Referring first to FIG. 4A, a flow diagram of a configuration process is provided. In block 402, View-Based Access Control Model tables of one or more SNMP Agent(s) of one or more network device(s) are configured. In block 404, one or more network management station(s) are configured to use proper mappings of VPN identifiers to security names. These blocks are described in more detail in the following sections; however, for the purpose of providing appropriate context and background, the use of MIB Views, which form a foundation for later description, is first described.

2.2 Using MIB Views for Security Purposes

In general, security is improved if an SNMP Agent can restrict access of a group to a subset of the managed objects that are available through the SNMP Agent. Accordingly, under SNMP, access to managed object information relating to a particular context is accomplished using one or more MIB Views. A MIB View is information identifying a specific set of Managed Objects and, in some cases, the specific Object Instances within the specific set of Managed Objects. Generally an SNMP Agent defines, for any given context, a general MIB View that provides access to all the management information in that context, and zero or more other MIB Views that contain a subset of the management information. Thus, access of a particular group can be restricted in any desired manner by specifying the rights of the group in terms of one or more MIB Views that include particular subsets of MIB managed objects.

Each MIB View is defined by an entry in a MIB View Table that is maintained in memory of a managed device under control of the SNMP Agent.

Because MIB managed objects and object instances can be identified using the tree-like naming structure provided by ISO OIDs, a MIB View may be defined as a set of view sub-trees. Each view sub-tree is a sub-tree within the Managed Object naming tree. Thus, a MIB View that includes all Managed Objects within a network management framework can be defined as a single view sub-tree. Further, more complicated MIB Views can be represented by the union of multiple view sub-trees.

However, some applications may require a MIB View that comprises a large number of MIB View sub-trees. An example of such an application is when a MIB View specifies all columns in one conceptual row of a MIB table, because columns in one conceptual row of a MIB table appear in separate sub-trees, one per column, each with a very similar format. Since the formats are similar, the required set of sub-trees is easily aggregated into one structure. This structure is named a family of view sub-trees after the set of sub-trees that it conceptually represents. A family of view sub-trees can either be included or excluded from a MIB View.

According to an embodiment, access control is provided based on VPN identifiers by configuring a View-based Access Control Model Table in each managed device with one or more entries for each VPN.

Figure 5:
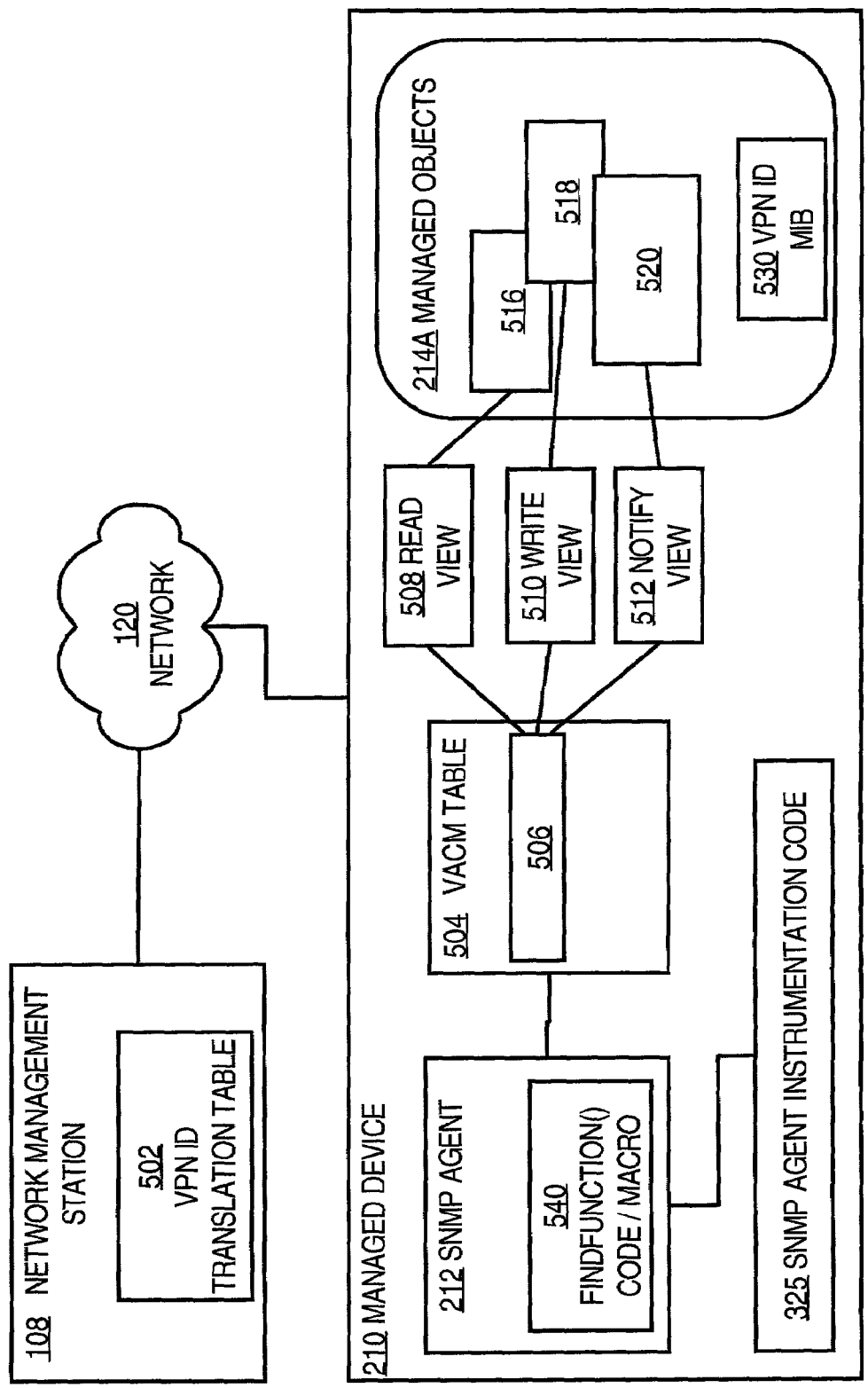
FIG. 5 is a block diagram of a managed device.

FIG. 5 is a block diagram of information structures that are involved in one embodiment. A network management station 108 maintains a VPN ID Translation Table 502, which is described further herein. Managed device 210 includes SNMP Agent 212, which is communicatively coupled to a VACM Table 504.

In general, in one embodiment, the VACM of SNMPv3 is used to create and store one or more associations of groups, which comprise zero or more securityNames, to MIB Views. Each MIB View defines a set of MIB objects to which access is allowed for network elements that participate in the VPN associated with a particular securityName. Separate MIB Views are defined for allowed operations such as read, write, and notify.

The VACM Table 504 comprises a plurality of entries 506. Each entry has a name corresponding to a VPN ID. In one specific embodiment, the name is given by a vacmContextName value. For each name, there may be one or more entries 506 that specify the access rights of a group by referencing zero or more securityNames that have the same access rights. For a particular context, identified by contextName, to which a group, identified by groupName, has access using a particular securityModel and securityLevel, that group's access rights are given by a read-view, a write-view and a notify-view are defined. A group name may be created or derived from the combination of a securityName and a securityModel.

Thus, each entry 506 in VACM Table 504 comprises values for:
securityModel—the Security Model that is in use;
securityName—the VPN ID;
securityLevel—a level of security applied to the VPN;
viewType—a value ("read," "write," or "notify") that indicates the kind of MIB View associated with the entry;
contextName—a context identifier;
variableName—an OID for a managed object, comprising an object type and an object instance.

In this context, a securityName is a human-readable string value that identifies a user, group of users, or application that wishes to perform an SNMP operation in a secure environment. The exact form and significance of a securityName depends upon the "security model" that is in use in a particular VPN environment. Examples of securityNames are community strings in SNMPv2c, and user names in the User Security Model of SNMPv3, as defined in RFC 2571.

As indicated by the viewType values, each entry in the VACM Table is associated with three MIB Views, namely a read-view 508, a write-view 510, and a notify-view 512. Each such view represents a subset of all managed objects 514 of MIB 214 that is available for access in response to a read, write, or notify request, respectively. In the example of FIG. 5, a read subset 516, write subset 518, and notify subset 520 are represented.

The read-view 508 represents the set of Object Instances to which a group is authorized to access when reading objects. Reading objects occurs when processing a retrieval operation, i.e., when handling Read Class PDUs. The write-view 510 represents the set of Object Instances authorized for the group when writing objects. Writing objects occurs when processing a write operation, i.e., when handling Write Class PDUs. The notify-view 512 represents the set of Object Instances authorized for the group when sending objects in a notification, such as when sending a notification, i.e., when sending Notification Class PDUs.

In one embodiment, block 402 of FIG. 4A involves establishing the foregoing data structures in memory of a managed device.

NMS 108, or an equivalent manager, configures each specified VACM MIB View, including as many read-views, write-views, and notify-views as are needed for the number of VPNs and access control policies that are in use, to grant access to one or more tables of managed objects within the MIB. MIB Views that are not configured for certain tables are assumed to not have access to these tables, or managed objects therein, or associated object instances.

In one embodiment, to ensure scalability, the VACM MIB Views do not reference individual Object Instances for each VPN. Instead, each MIB View 508, 510, 512 is specified in terms of one or more tables of Managed Objects in MIB 214. Consequently, the configuration of only the tables, and not the specific Object Instances within the tables, does not preclude proper denial of access to certain VPNs. The configuration of only the tables simply prevents requests from disallowed VPNs from accessing the tables at this point. That is, general access to tables of MIB objects is granted during the first sub-phase described herein, in which initial security and view access occur. Access by a particular request to a specific MIB object of a particular table is controlled during the third sub-phase, as described further below.

In addition, if a VPN is configured to have access to a particular managed object table, then it should have access to any Object Instances that were configured in the name of that VPN, but no others. At this point, when the MIB instrumentation 325 receives a variable and an operation from a request, the instrumentation can then assume that the request generally has access to the referenced MIB object table. However, it may not have access to certain Object Instances if no Object Instances are configured for that VPN.

Using the foregoing approach, large subsections or sub-trees of the MIB can simultaneously store Object Instances for all VPNs as well as for objects that are associated with the device 210 generally.

2.3 Configuration of NMS with Mapping of Security Names to VPN Identifiers and to Generate Requests with VPN ID'S Referring again to FIG. 4A, in one embodiment, block 404 involves establishing an agreement of an NMS, or other manager, and an SNMP agent operating in a VPN environment on a mapping between SNMP securityNames and VPN identifiers, such that the VPN associated with any SNMP request is unambiguously designated by a particular securityName.

In one approach, a VPN ID Translation Table 502 is created and stored in NMS 108 to associate securityNames with VPN IDs. Each securityName identifies a user and is associated with a security policy that is implemented by the objects that are available in particular MIB views. In one specific embodiment, each entry in the VPN ID Translation Table comprises a securityName value, a VPN ID value, and a rowStatus value. Creation and deletion of table entries may be carried out using NMS 108 or a similar manager.

By having the VPN ID Translation Table 502 store a mapping of VPN IDs to SNMP securityNames, and having VACM Table 504 store a mapping of securityNames to MIB Views, the NMS makes the mapping agreement between the SNMPv3 securityNames and VPN IDs explicit.

In another embodiment, VPN IDs also are stored as entries in a VPNID MIB 530. The VPNID MIB comprises a table, indexed by the same indexes from the MIB View Table, which contains additional policy information pertaining to each VPN. Thus the VPNID MIB table facilitates policies that are not included in the VACM MIB, or other policies that are not yet contemplated. In an embodiment, NMS 108 is provided with a manager that can configure policies in the VPNID MIB 530 remotely.

According to one embodiment, the NMS is configured to provide a valid VPN ID in the SNMP Context string when requesting information for a specific VPN. In another embodiment, the NMS provides a means for managing VPN IDs by entering, modifying, and deleting information in a VPN ID MIB table and in the VACM table of a managed device. An appropriate command line interface or graphical user interface may be provided to display the contents of such tables, to receive data for entry in the tables, to select deletion commands, etc. In other embodiments, commands and functions may include viewing and modifying existing IDs, modifying policies related to them, creating new IDs and policies, etc.

In one embodiment, NMS 108 and an SNMP Agent of each device that is participating in the processes disclosed herein are configured in the preceding manner.

2.4 Selecting MIB Views Based on Security Names

FIG. 4B is a flow diagram providing a high-level view of a process of generating and processing SNMP requests that are subject to VPN access control.

In block 410, an SNMP request that includes a VPN identifier is generated at a network management station. For example, block 410 may involve generating an SNMP request under software control using a commercial network management software system such as Cisco Resource Manager Essentials, from Cisco Systems, Inc. Such requests may relate to device discovery, device configuration, or other device management functions. Block 410 also encompasses dispatching the request into the network through appropriate means, and causing the request to traverse the network to arrive at the desired managed device, using either broadcast or unicast techniques. The VPN identifier uniquely identifies a particular virtual private network to which the request is directed and restricted.

In block 412, the SNMP request is received at an SNMP Agent of a managed device. In block 414, the request is processed by the SNMP Agent using only MIB objects that are associated with the current virtual private network.

In block 416, a response is generated and returned to the network management station.

In one embodiment, when an SNMP agent receives an SNMP request, the agent extracts the securityName from the request by decomposing the request into individual fields. Based on the VACM associations, the agent then matches the securityName value to a pre-configured SNMP MIB View that implements an access policy for the associated VPN ID. The access policy is presumed to restrict requests for the identified VPN to the appropriate subset of the SNMP agent's managed object tree. As a result, the access policy embodied in the MIB Views restricts requests for a particular VPN to an appropriate subset of the SNMP Agent's managed object space.

Figure 6A:
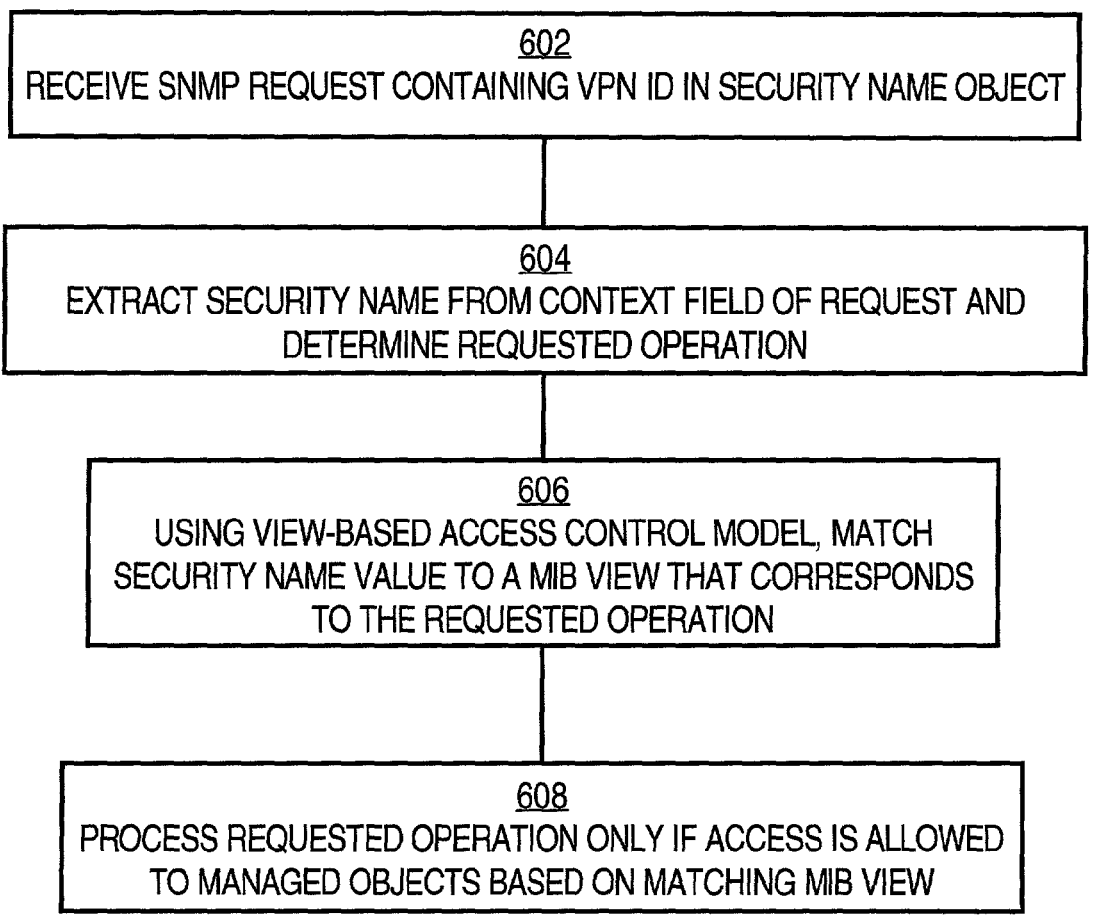
FIG. 6A, FIG. 6B, and FIG. 6C are flow diagrams of a process of receiving and responding to SNMP requests that are subject to VPN access control.
Figure 6B:
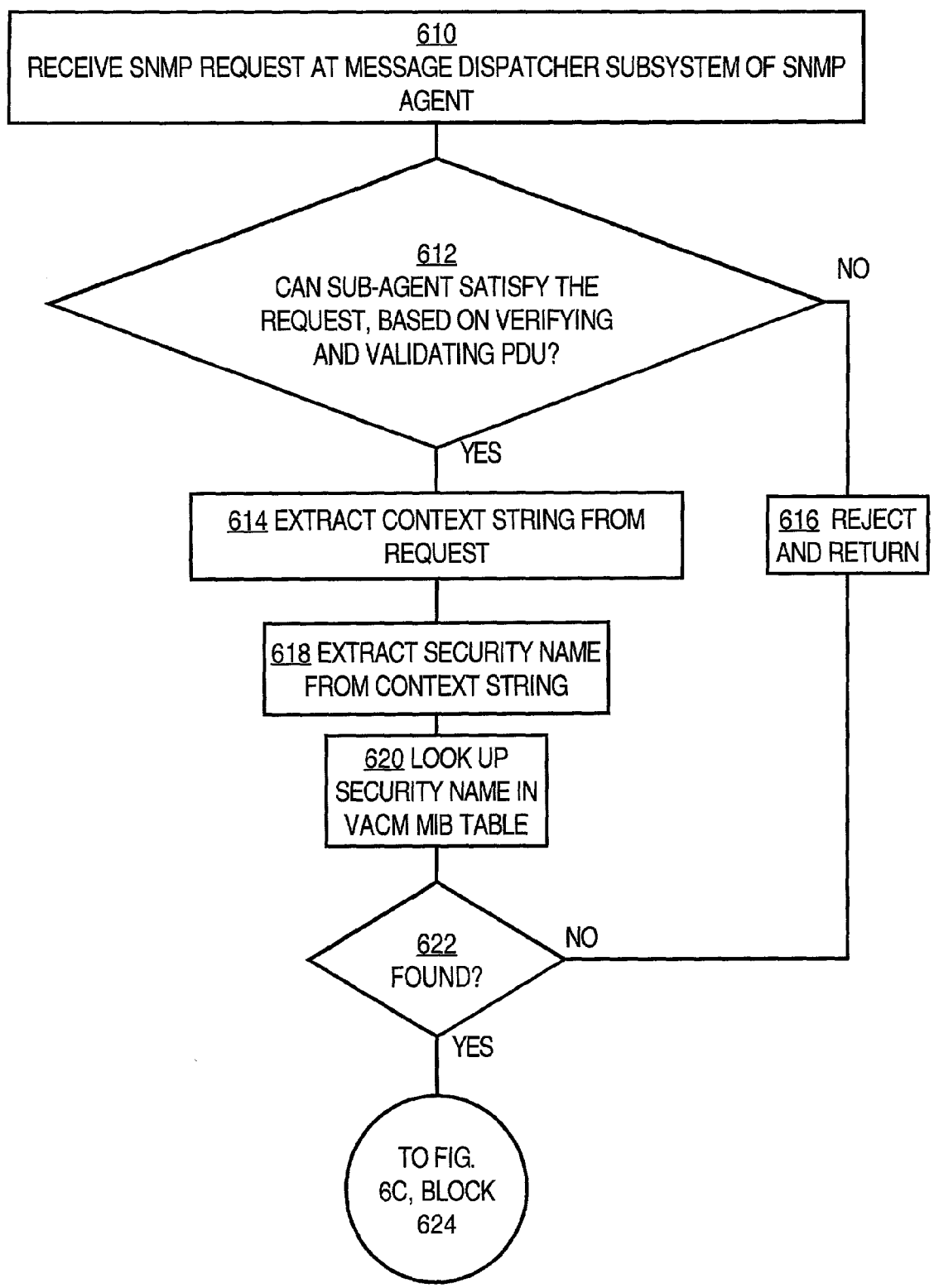
Figure 6C:
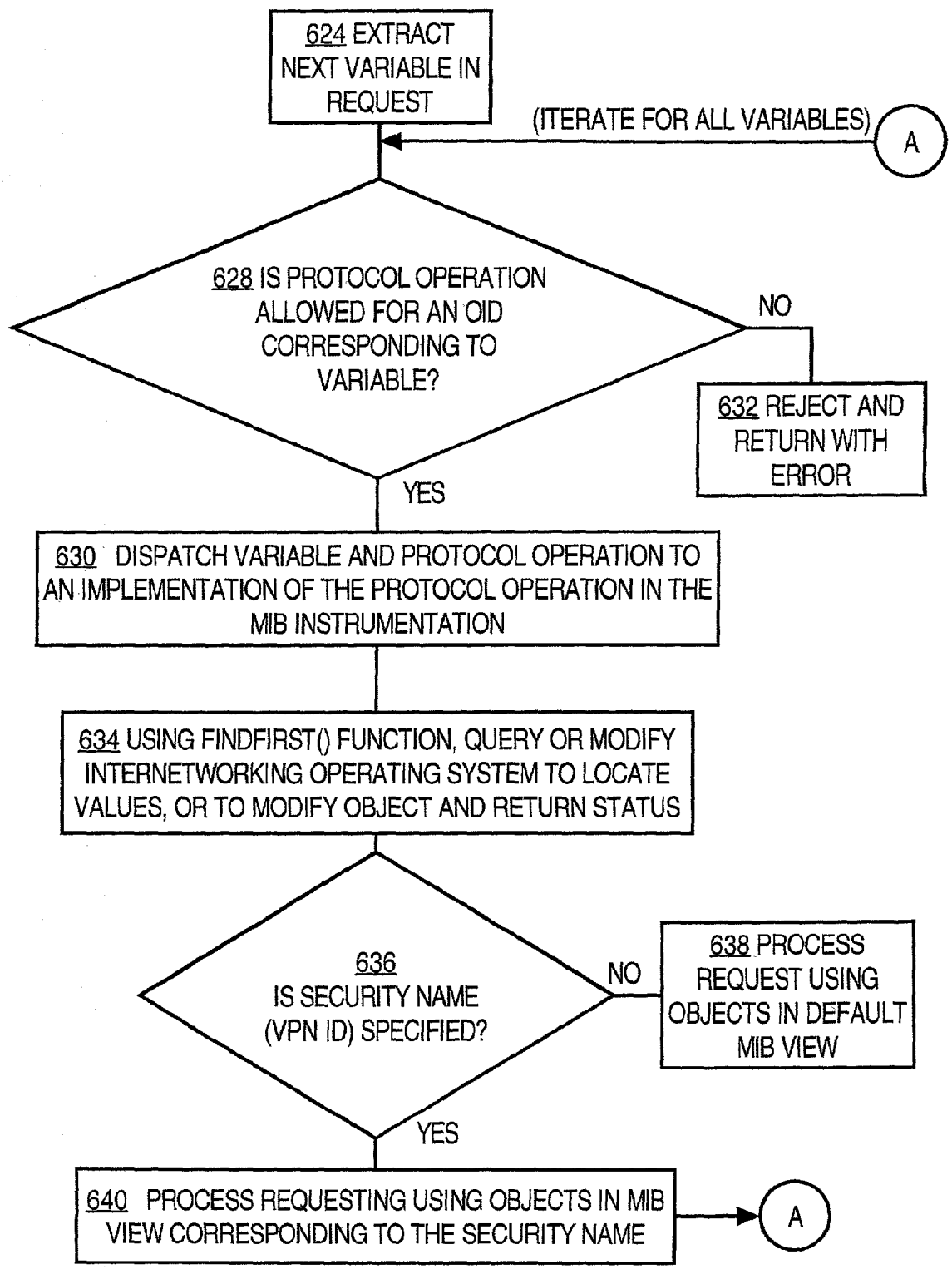

FIG. 6A, FIG. 6B, and FIG. 6C are flow diagrams of a process of receiving and responding to SNMP requests that are subject to VPN access control, in one specific embodiment.

Referring first to FIG. 6A, in block 602, an inbound SNMP request arriving at an SNMP-enabled network device is received at an SNMP Dispatcher, e.g., Message Dispatcher Subsystem 311. The request contains a VPN ID in the form of a securityName object as defined in SNMPv3.

In block 604, the securityName object value is extracted from the context field of the request, and the requested operation is determined. Examples of operations include Get, Set, etc.

In block 606, using the view-based access control model that has been configured as otherwise described herein, the securityName value is matched to a MIB View that corresponds to the requested operation. For example, a corresponding read-view, write-view, or notify-view is selected.

In block 608, the requested operation is processed only if access is allowed to managed objects required for the requested operation, as indicated by the selected MIB View.

In general, the Message Dispatcher 311 passes all authenticated or validated requests to the Command Responder application and, ultimately, to the MIB instrumentation 325. It is unnecessary in most cases to pass a VPN ID, explicitly or in the form of a securityName, to the MIB instrumentation because the VPN partitioning of Managed Objects as described herein inherently accomplishes access control with respect to the MIB instrumentation. Stated otherwise, it is unnecessary for the MIB instrumentation to determine whether access to a Managed Object is allowed for a particular VPN because a request cannot reach the MIB instrumentation in reference to a particular Managed Object unless a request for that VPN is allowed to access the Managed Object. In particular, using the method described herein, access to object instances is granted only if the appropriate securityName match is made during an authentication phase. For the relatively infrequent cases where the MIB instrumentation needs the VPN ID to process a management request, a new MIB is created, according to the invention, which maps securityNames to VPN IDs and allows a manager to tell a SNMP Agent that a particular VPN ID is associated with a particular securityName.

The process of FIG. 6A is now described in more detail, for one embodiment, with respect to FIG. 6B, FIG. 6C. In general, the process of FIG. 6B, FIG. 6C, involves three sub-phases of authentication and access that are applied to an SNMP request arriving at a network device before it is granted access to a specific MIB managed object. Referring now to FIG. 6B, in a first sub-phase that starts at block 610, a sub-agent in a Distributed SNMP Agent implementation receives a request. In block 612, the sub-agent examines the request to determine whether the sub-agent can satisfy the request. If the sub-agent cannot satisfy the request, the sub-agent rejects the request and returns it, as indicated by block 616. To determine whether a request can be or satisfied, the sub-agent determines whether the PDU in the request can be verified and validated using security subsystem 315.

In the second sub-phase, starting at block 614, the VACM MIB Table and associated MIB Views are used for access control. Each PDU that is received in a request contains a context string, a protocol operation and information identifying one or more MIB variables over which the specified operation is to be executed. In block 614, the context string is extracted from the request, and in block 616 the securityName is extracted from the context string.

In block 620, the securityName is looked up in the VAC MIB Table, and in block 622 a determination is made whether the securityName is found in the lookup operation. If the specified context string is found in the table of MIB Views, then the test of block 622 is affirmative, and control passes to block 624. In general, in succeeding steps, the access control policy for that context string is accessed in the form of MIB Views that correspond to the protocol operation in the request.

Referring now to FIG. 6C, block 624, information identifying the next MIB variable in the request is extracted. In block 628, a test is made to determine whether the protocol operation specified within the PDU of the request is allowed for an OID corresponding to the variable, then the operation is allowed to proceed. In particular, information identifying the variable and protocol operation is dispatched to an implementation of the protocol operation in the MIB instrumentation, as indicated by block 630.

If the protocol operation specified within the PDU is not allowed for that Object Identifier, the entire PDU is rejected and returned to the NMS with an error status, as shown by block 632.

Upon initiation of the third sub-phase, starting at block 634, a variable from a request has been dispatched to the MIB instrumentation code that implements the requested protocol operation as indicated by block 632.

In one specific embodiment, which is implemented in the context of Cisco Systems' Internetworking Operating System (IOS) software, the instrumentation code generally is automatically generated code from the MOSY Compiler that is commercially available from SNMP Research, Inc. In this embodiment, the automatically generated code is "stub" code that does not contain any actual instrumentation. When the stubs of the stub code are filled-in, the stubs are made to query or modify the underlying IOS software in an effort to either find the appropriate value(s) which will be returned to Message Dispatcher 311, or modify the underlying object and return a status of this operation to Message Dispatcher 311. At this point in processing, it is assumed that the request does have access to the managed object table accessed by the code receiving the request.

Typical implementations of VPN messaging all involve sending packet messages in which data is partitioned into separate blocks of data in which each block is associated with a particular VPN. Consequently, if an SNMP request received from a VPN-enabled device is passed to instrumentation code that chooses one, and only one, MIB table to access, then the request will only have access to the managed object instances that belong to that VPN. In the case where VPN object instances are commingled, e.g., as when an additional index is added internally, additional processing is required.

In one embodiment, a function located in existing SNMP Agent code is adapted to provide a new access control function. Specifically, a FindFirst( ) function is used. In conventional SNMP implementations, the FindFirst( ) function is generated as a "stub" function and is later modified by the user to find an appropriate table pointer. This pointer is then passed to other operations that use it in addition to the managed object instance ID, which serves as an index to find a specific object in memory.

Accordingly, as indicated in block 634, using the FindFirst( ) function, the process queries or modifies objects or functions in the IOS software to locate appropriate variable values for processing, or to modify a specified object, and to return a status value. According to an embodiment, the FindFirst( ) function is modified to provide two processing paths based on whether a VPN ID is provided in the function call. At block 636, a test is carried out to determine whether a VPN ID is specified in the form of a securityName value in the request.

If no VPN ID is specified, then a global or default table is selected. The request is processed using managed objects and object instances that are contained within the default MIB View, as indicated by block 638. This table is analogous to the table selected in the FindFirst( ) function before it had VPN processing capability.

If a VPN ID is specified, then in block 640 the request is processed using objects in the MIB View corresponding to the securityName. In essence, the VPN ID is used to select an appropriate VPN MIB table in memory.

In one specific implementation, executable code for the foregoing processes is defined as a macro within the FindFirst( ) stub function. Executable code based on the macro is automatically generated when the FindFirst( ) function is made executable, i.e., at compile time using the MOSY Compiler. The code of the macro is configured to look up a mapping between VPN ID and an internal table identifier. An administrative user is expected to provide additional source code that implements specific, per-VPN processing based on the results of the mapping look-up. Further, the mapping that is used by the macro is expected to be initialized by the administrative user engineer. In addition, when MIB tables are added or deleted, the SNMP Agent is expected to update the mapping to reflect such additions or deletions.

In this configuration, use of a modified sub-agent precludes access by one VPN to objects that exclusively associated with another VPN. More specifically, the constraints of the FindFirst( ) function make it possible to look up only the appropriate table within IOS that corresponds to the specified VPN, if one exists. This prevents one VPN from gaining access to managed instances or other sub-tables that are not associated with it.

The third sub-phase may be implemented in the form of a macro that is generated as part of the sub-agent code using an automatic code generator, such as the MOSY Compiler.

In one specific embodiment, the FindFirst( ) function and macro are defined as follows in TABLE 1. A management user is expected to fill in certain parts as noted below. The function is generated for each module, and therefore the module name may form part of the function name. Accordingly, care should be taken to ensure that MIB file names do not overlap, causing namespace clashes. The purpose of generating one function per file is so that each technology type has the flexibility to modify the existing table lookup functionality, or to define it anew.

TABLE 1

EXAMPLE FINDFIRST( ) FUNCTION

```
/*
 * Name: k_PingMIBEntry_get
 *
 * Description:  This function is called by the
 *               core toolkit when the Ping MIB
 *               entry wishes to be retrieved.
 *
 *               Modification for VPN-awareness:
 *
 *               The function now first determines
 *               if the given securityName maps to
 *               an internal VRF table. If one exits,
 *               it retrieves it and passes it into
 *               the function. This new table pointer
 *               is used as the basis point for the
 *               existing lookup routines. Now they
 *               retrieve the first (and subsequent)
 *               elements only from this table reference.
 *               In doing so, the can only find elements
 *               which are part of this table which
 *               only contains instances belonging to
 *               the specified VPN.
 *
 *               Note that in many cases, the table returned
 *               is unnecessary due to the fact that
 *               once the pointer to the first internal
 *               data structure is returned, the internal
 *               code will always use this as the basis
 *               to find the next object when desired. In
 *               these cases, as long as it is guaranteed
 *               that only instances belonging to that VPN
 *               are linked in these data structures, then
 *               the table pointer itself need not be passed.
 *               In the example below, data* can be set to
 *               the correct starting point, for example.
 */
pingEntry_t *
k_PingMIBEntry_get(int serialNum, ContextInfo *contextInfo,
                   int nominator, int searchType,
                   IpAddress pingTarget )
{
    int                          status = NO_ERROR;
    static mplsInSegmentEntry_t  data;
    mplsInSegmentEntry_t*        retVal = NULL;
    VRF*                         vrf = NULL;
    data.pingTarget = pingTarget;
    /* Find VRF Table pointer given VPN ID (security Name) */
    if( 0 == (vrf = FindFirst(contextInfo—>securityName)))
    {
        /* invalid VPN ID (securityName) specified */
        retVal = NULL;
    }
    /* code functions as it did in the past . . . */
```

TABLE 1-continued

EXAMPLE FINDFIRST( ) FUNCTION

```
    /* If the SNMP operation is a GET-NEXT */
    if ( searchType == NEXT )
    {
        status = GetNextPingEntry(vrf,
                                &(data.pingTarget));
    }
    /* if Get-Next and we found a next instance, or if a Get
     * operation, find it, otherwise there was an error in
     * Get-Next above.
     */
    if ( NO_ERROR == status )
    {
        /* if successful get, return a pointer to the
         * filled-in data structure */
        if ( NO_ERROR == (GetPingEntry(&data)) )
        {
            retVal = &data;
        }
    }
    return retVal;
}
```

Thus, an access control approach has been described in which VPN access control policy is defined in terms of MIB Views that are associated with a VACM table. VPN identifiers are carried in the securityName field of a context string in an SNMP request. Upon receipt, the VPN identifier is extracted and mapped to a MIB View for the requested operation. The requested operation is allowed to access only the managed objects that are identified in the MIB Views. Therefore, VPN-based access control is imposed on SNMP requests without modification to MIBs.

2.5 Processing Information Relating to META-VPNS

In an alternative embodiment, a process as disclosed herein allows one VPN to access several other VPNs in an administrative or hierarchical role. In this arrangement, a first VPN acts as a "VPN of VPNs." This feature is useful, for example, for Internet Service Providers (ISPs) who may sell several VPNs to different customers, and then desire to have administrative access to message traffic associated with all of the VPNs. A VPN that possesses access control over another VPN is referred to herein as a "Meta-VPN".

Providing a way to view VPNs as hierarchical levels of security or access is useful for administration and provides an intuitive view. However, the specific configuration of such functionality depends on whether a distributed or monolithic SNMP Agent implementation is used. In one case, the functionality for viewing VPNs as a collection of hierarchical levels of security is implemented on the NMS. Alternatively, it is possible, and preferable, to implement functionality for viewing VPNs as a collection of hierarchical levels of security in the SNMP Agent through a modification of its configuration.

In the first case, in which the functionality for viewing VPNs as a collection of hierarchical levels of security is implemented on the NMS, the SNMP Agent instrumentation is implemented as a single table of unique instances. In this case, each instance is associated with a particular VPN, and the VPN ID is only used as a means of access control for a set of unique instances contained within the SNMP Agent. For this reason, the SNMP Agent may support a meta-VPN that provides a NMS with access to all VPNs that are encompassed by it. Further, the meta-VPN provides the NMS with access to all object instances that the meta-VPN has access to as well.

In one specific embodiment, support for a meta-VPN is accomplished by adding another entry to the VACM table that encompasses the same tables as the other VPNs that are overseen. Therefore, if the SNMP Agent is implemented by using a single table containing unique instances, it is possible to implement this functionality on the SNMP Agent without any modifications to the NMS.

In one embodiment, the NMS is made aware of meta-VPNs by detecting when VACM tables have entries that encompass the same tables as the other VPNs that are overseen. In this embodiment, or in an alternative embodiment, the NMS provides a configuration interface. The configuration interface may comprise a command-line interface, graphical user interface, or other means for receiving user input that requests creation of a meta-VPN and specifies the VPNs that participate in the meta-VPN, and in response, creates and stores entries in VACM tables of managed devices to result in creating the meta-VPN.

In the second case, the SNMP Agent is implemented to divide the instrumentation into a plurality of discrete tables that allow multiple instances of the same OID to coexist. In this second case, as in the first case, a manager configures a meta-VPN by adding an entry to the SNMP Agent's VACM table with the same access privileges as the superset of the VPNs that participate in the meta-VPN. In this approach, the entry in the VACM only guarantees a particular VPN ID access to the top of a table, but not necessarily to its Object Instances. As also discussed above, access to Object Instances is granted or denied using the VPN ID as a key to access a particular table only when the request reaches the SNMP Agent's instrumentation, and the instrumentation is deciding which VPN table to act upon.

For example, assume that a request arrives at the sub-agent, and the request contains a single OID and the meta-VPN as its context string. The sub-agent processes the request during the third security sub-phase, as discussed above. The SNMP Agent then extracts the securityName from the context string, and looks up the securityName in the VACM table. If it finds an entry, the SNMP Agent passes the request to the appropriate SNMP Agent instrumentation. The SNMP Agent instrumentation is required to select which VPN table to act on. However, making this selection may occur in several ways, because it may not be immediately apparent which table the instrumentation should select if more than one VPN belongs to the meta-VPN.

In one approach, the SNMP Agent selects the first VPN that is found to match the meta-VPN and applies the request to it. However, implementation of this approach is non-deterministic, because the first item selected depends entirely upon which entry was created first. Furthermore, allowing a single request to imply multiple requests poses another problem in both of the aforementioned cases: when one of the requests results in an error, what does the SNMP Agent do? Unwinding, or undoing, such a situation is complicated.

In another approach, the request is made to apply to all VPNs that fall within the group of VPNs covered by the meta-VPN. However, this approach violates the definition of the GET/SET SNMP operations, which are required to act on only a single OID instance. In addition, this approach also experiences the same difficulties discussed above if one of the requests results in an error.

In yet another approach, the NMS sends multiple requests to the SNMP Agent, where there is one request for each VPN. The NMS knows how many requests to send because it has access to the VACM, and thus the configuration of meta-VPNs. In this approach, as a consequence, the NMS provides actual implementation and configuration of meta-VPNs. This approach avoids the above-noted problems.

In one specific approach, the NMS sends multiple requests on behalf of the specified meta-VPN to the SNMP Agent, fields multiple responses, and aggregates them for the user. The NMS still may configure all of the valid VPNs within the VACM table on the SNMP Agent. This facilitates a single point of configuration for VPNs and their associated access policies. Using this approach, design modifications necessary to facilitate VPN-awareness on the sub-agent are simplified.

Both cases described above may coexist on the same device. That is, if some SNMP Agents implement their tables so that instances are unique regardless of the VPN ID, and other SNMP Agents are implemented to divide the instrumentation into several discrete tables that allow multiple instances of the same OID to coexist, both may coexist on the SNMP Agent. In cases where both implementations coexist on the SNMP Agent, it is desirable for the manager to provide a means of managing meta-VPNs for the user.

2.6 Extensions and Alternatives of the Approaches

The approaches described herein are based on existing security and access control mechanisms of SNMP. Consequently, the solution presented by the method of the present invention is simple and scalable.

While SNMPv3 supports use of MIB Views as one mechanism for access control with respect to managed objects, other forms of a security for SNMP elements are also available. For example, SNMPv3 Agents and managers can use encryption and password challenges. These mechanisms may be used to supplement the access control benefits offered by the embodiments described herein. For example, if a user of one VPN is able to discover the VPN ID for a second VPN, that user could issue a request with the second VPN ID as the securityName and obtain access to managed objects associated with the second VPN ID through the approaches described herein. Accordingly, to improve security, a system manager can employ standard SNMPv3 password challenge and encryption mechanisms.

In the future, network devices are expected to support multiple VPN technologies. The approaches described herein are configured to support all future types of VPN technologies, regardless of how they partition Object Instances. In particular, the approaches described herein do not determine and do not need to know which specific type of VPN is supported. Since current and foreseeable VPN technologies are nothing more than a further partitioning of the space of Object Instances, it is clear that whatever partitioning is decided upon, the approaches herein will facilitate it.

Furthermore, nothing herein precludes use of the approaches herein in a device that supports several competing VPN technologies simultaneously. The approaches herein may be readily adapted to support a new VPN technology by appropriate modifications to the FindFirst( ) function that cause the function to fetch the appropriate table to act upon in the manner described above.

The approaches described herein solve the problem of accessing SNMP MIBs on a per-VPN-basis, yet require no modifications to existing MIBs. Using the approaches described herein, access to information for a specific VPN is restricted to a subset of Object Instances in the OID tree. Consequently, a particular VPN is preventing from viewing information belonging to other VPNs.

Further, in additional or alternative approaches, modifications to the SNMP framework enable the majority of SNMP Agents and their corresponding MIBs to become "VPN aware" without any modification to the SNMP Agent code or to the MIBs themselves. In addition, in the very few cases where SNMP Agents must explicitly know whether a particular request is destined for a VPN, the SNMP Agent can obtain the VPN ID from the SNMP Community String.

The approaches described herein can be used to allow one VPN to access several other VPNs in an administrative or hierarchical role. This aspect is particularly useful for ISPs who often sell several VPNs to different customers, and then desire to have administrative access over all of the VPNs.

VPN spoofing is a known form of security attack on SNMP-enabled network devices. An SNMP Agent can defend against such attacks when receiving and returning SNMP requests by keeping track of the VPN interface on which a request is received, and by responding to the message only on that interface. Alternatively, the agent may be configured with a management interface that may also receive a copy of the response.

This approach is useful for several reasons. First, when a router acts as a VPN hub, it may be possible that it has many interfaces that connect to any particular VPN. However, it is undesirable to generate unwanted copies of the response to each and every interface because of the resulting increase in traffic. The requestor should be on the interface on which the message was received, so that returning a single copy of the response on that interface has a high probability of reaching the sender. There is a slim possibility that the requestor is spoofing a real address, and returning the response only on the interface from which it was received may tend to facilitate the attack. If SNMPv3 security is employed, this is unlikely. The spoofing sender also may send requests from an illegal address on that VPN interface, while expecting the reply to return; in that case, sending the response on the interface from which a request came will fail, because there is no route to that host. This further thwarts efforts at VPN spoofing.

Implementations are also expected to issue SNMP traps only on the VPN interface on which the NMS or trap receiver is configured to receive them. Otherwise, un-encrypted traps from inappropriate VPNs may be received on interface which have trap listeners who are either uninterested or not allowed to receive such traps. In that case, trap listeners should be configured on the appropriate ports.

SNMP trap requests or inform requests issued by NMS 108 may contain the VPN ID in order to allow the NMS to designate from which VPN the trap originated. In the approaches disclosed herein, the VPN designation occurs without special processing or modification. In particular, the approaches herein use SNMP community strings to identify VPNs. SNMP traps contain a community string, and therefore will contain the appropriate VPN ID therein. The agent is expected to have an appropriate trap receiver programmed therein, and appropriate routes from the agent to the trap receiver are assumed to be configured, so that the emitted traps can be received by the designated trap receiver.

3.0 Hardware Overview

Figure 7:
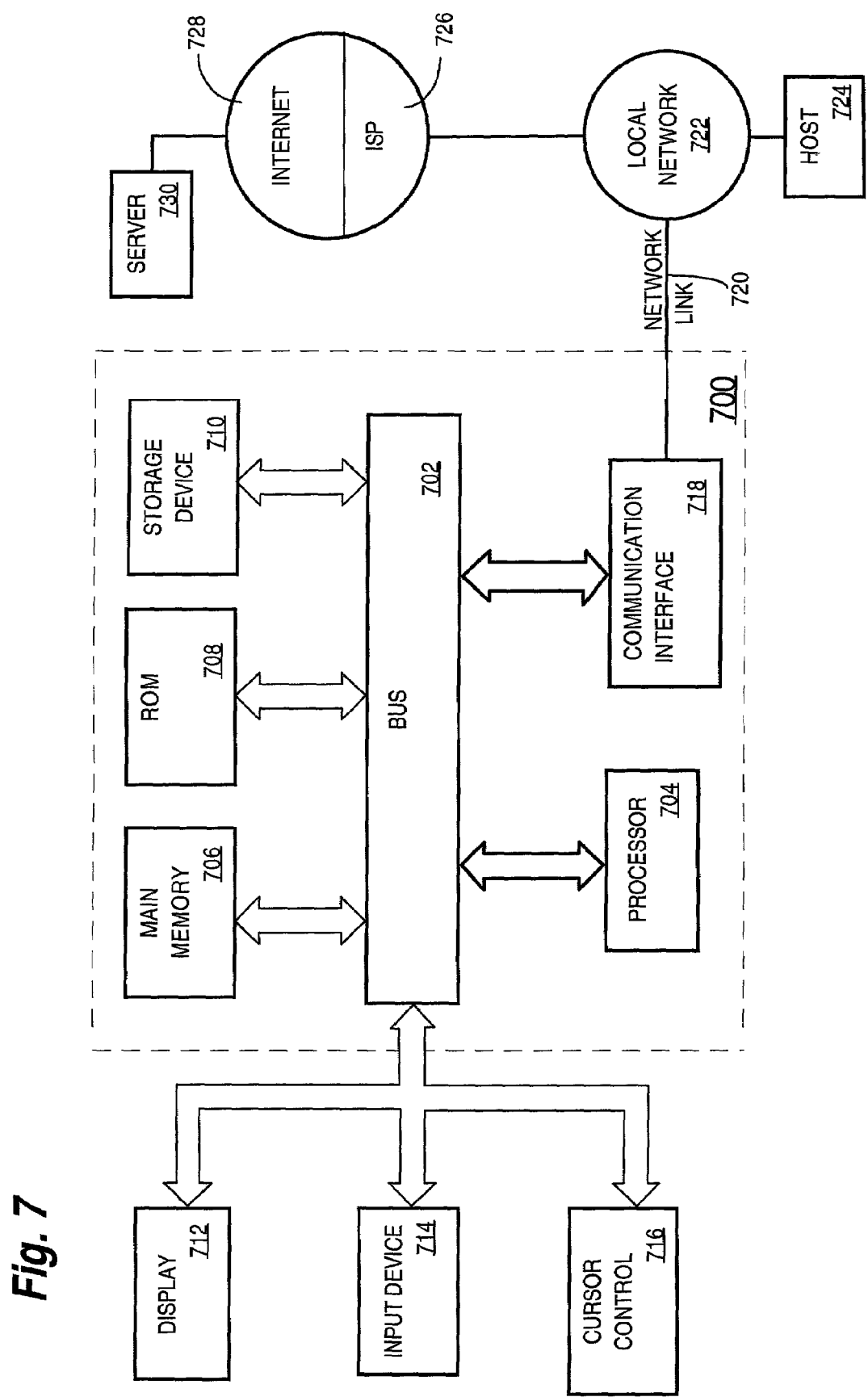
FIG. 7 is a block diagram that illustrates a computer system upon which an embodiment may be implemented.

FIG. 7 is a block diagram that illustrates a computer system 700 upon which an embodiment of the invention may be implemented. The preferred embodiment is implemented using one or more computer programs running on a network element such as a router device. Thus, in this embodiment, the computer system 700 is a router.

Computer system 700 includes a bus 702 or other communication mechanism for communicating information, and a processor 704 coupled with bus 702 for processing information. Computer system 700 also includes a main memory 706, such as a random access memory (RAM), flash memory, or other dynamic storage device, coupled to bus 702 for storing information and instructions to be executed by processor 704. Main memory 706 also may be used for storing temporary variables or other intermediate information during execution of instructions to be executed by processor 704. Computer system 700 further includes a read only memory (ROM) 708 or other static storage device coupled to bus 702 for storing static information and instructions for processor 704. A storage device 710, such as a magnetic disk, flash memory or optical disk, is provided and coupled to bus 702 for storing information and instructions.

A communication interface 718 may be coupled to bus 702 for communicating information and command selections to processor 704. Interface 718 is a conventional serial interface such as an RS-232 or RS-422 interface. An external terminal 712 or other computer system connects to the computer system 700 and provides commands to it using the interface 714. Firmware or software running in the computer system 700 provides a terminal interface or character-based command interface so that external commands can be given to the computer system.

A switching system 716 is coupled to bus 702 and has an input interface 714 and an output interface 719 to one or more external network elements. The external network elements may include a local network 722 coupled to one or more hosts 724, or a global network such as Network 728 having one or more servers 730. The switching system 716 switches information traffic arriving on input interface 714 to output interface 719 according to pre-determined protocols and conventions that are well known. For example, switching system 716, in cooperation with processor 704, can determine a destination of a packet of data arriving on input interface 714 and send it to the correct destination using output interface 719. The destinations may include host 724, server 730, other end stations, or other routing and switching devices in local network 722 or Network 728.

The invention is related to the use of computer system 700 for providing a virtual private network using simple network management protocol. According to one embodiment of the invention, a virtual private network using simple network management protocol is provided by computer system 700 in response to processor 704 executing one or more sequences of one or more instructions contained in main memory 706. Such instructions may be read into main memory 706 from another computer-readable medium, such as storage device 710. Execution of the sequences of instructions contained in main memory 706 causes processor 704 to perform the process steps described herein. One or more processors in a multi-processing arrangement may also be employed to execute the sequences of instructions contained in main memory 706. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 704 for execution. Such a medium may take many forms, including but not limited to, non-volatile media, volatile media, and transmission media. Non-volatile media includes, for example, optical or magnetic disks, such as storage device 710. Volatile media includes dynamic memory, such as main memory 706. Transmission media includes coaxial cables, copper wire and fiber optics, including the wires that comprise bus 702. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 704 for execution. For example, the instructions may initially be carried on a magnetic disk of a remote computer. The remote computer can load the instructions into its dynamic memory and send the instructions over a telephone line using a modem. A modem local to computer system 700 can receive the data on the telephone line and use an infrared transmitter to convert the data to an infrared signal. An infrared detector coupled to bus 702 can receive the data carried in the infrared signal and place the data on bus 702. Bus 702 carries the data to main memory 706, from which processor 704 retrieves and executes the instructions. The instructions received by main memory 706 may optionally be stored on storage device 710 either before or after execution by processor 704.

Communication interface 718 also provides a two-way data communication coupling to a network link 720 that is communicatively coupled to a local network 722. For example, communication interface 718 may be an integrated services digital network (ISDN) card or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by a Network Service Provider (ISP) 726. ISP 726 in turn provides data communication services through the worldwide packet data communication network now commonly referred to as the "Internet" 728. Local network 722 and Network 728 both use electrical, electromagnetic or optical signals that carry digital data streams. The signals through the various networks and the signals on network link 720 and through communication interface 718, which carry the digital data to and from computer system 700, are exemplary forms of carrier waves transporting the information.

Computer system 700 can send messages and receive data, including program code, through the network(s), network link 720 and communication interface 718. In the Network example, a server 730 might transmit a requested code for an application program through Network 728, ISP 726, local network 722 and communication interface 718. In accordance with the invention, one such downloaded application provides for a virtual private network using simple network management protocol as described herein.

The received code may be executed by processor 704 as it is received, and/or stored in storage device 710, or other non-volatile storage for later execution. In this manner, computer system 700 may obtain application code in the form of a carrier wave.

4.0 Disclosure is an Example

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of controlling access of network management requests directed to one or more network devices that participate in a virtual private network, the method comprising the computer-implemented steps of:

a network manager and a managed network device agreeing on a first mapping between securityNames and virtual private network identifiers;

storing, at the network manager, a translation table containing the first mapping of securityName values to corresponding virtual private network identifiers;

storing, at a managed network device, a view-based access control model table containing a second mapping of securityName values to corresponding MIB (Management Information Base) Views;

receiving at the managed network device a request from the network manager, which is participating in a particular virtual private network, to carry out a management protocol operation that involves one or more managed objects associated with one or more network devices participating in the particular virtual private network;

wherein the request contains a particular securityName value that is mapped to the particular virtual private network identifier in the first mapping;

at the managed network device, extracting the particular securityName value from the request and identifying, based on the particular securityName value that is mapped in the second mapping, one or more corresponding particular MIB (Management Information Base) Views;

at the managed network device, identifying, based on the one or more corresponding particular MIB (Management Information Base) Views and from a plurality of managed objects, a subset of managed objects that requests associated with the particular virtual private network are permitted to access; and in response to the request, providing to the network manager access to only the subset of managed objects from the plurality of managed objects.

2. A method as recited in claim 1, further comprising the steps of providing, at the managed network device, the second mapping in the form of one or more entries in a view-based access control model table that associate SNMPv3 securityName values to corresponding MIB (Management Information Base) Views.

3. A method as recited in claim 1, further comprising the steps of providing, at the managed network device, one or more entries in a view-based access control model table that associate SNMPv3 securityName values to corresponding MIB (Management Information Base) Views, wherein each of the securityName values is associated with a virtual private network, and wherein the corresponding MIB Views represent access control policies applicable to the associated virtual private networks.

4. A method as recited in claim 1, further comprising the steps of providing, at the managed network device, the second mapping, and wherein the steps of identifying a subset of objects and providing access comprise the steps of:

determining whether the securityName value from the request is in the second mapping;

when the securityName value from the request is in the second mapping:

identifying a management information base variable referenced in the request;

based on one or more views referenced in the second mapping, determining whether a protocol operation of the request is allowed for the variable;

dispatching information identifying the variable and the protocol operation to a code implementation of the protocol operation only when the protocol operation is allowed for the variable.

5. A method as recited in claim 1, further comprising the steps of providing, at the managed network device, the second mapping in the form of one or more entries in a view-based access control model table that associate security name values to corresponding MIB (Management Information Base) Views, and wherein the steps of identifying a subset of objects and providing access comprise the steps of:

determining whether the securityName value from the request is in the view-based access control model table;

when the securityName value from the request is in the view-based access control model table:

identifying a management information base variable referenced in the request;

based on one or more MIB Views referenced in the view-based access control model table, determining whether a protocol operation of the request is allowed for the variable;

dispatching information identifying the variable and the protocol operation to a code implementation of the protocol operation only when the protocol operation is allowed for the variable.

6. A method as recited in claim 1, further comprising the steps of providing, at the managed network device, one or more entries in a view-based access control model table that associate SNMPv3 securityName values to corresponding MIB (Management Information Base) Views, wherein each of the securityName values is associated with a virtual private network, and wherein the corresponding MIB Views represent access control policies applicable to the associated virtual private networks, and wherein the steps of identifying a subset of objects and providing the request with access comprise the steps of:

determining whether the securityName value from the request is in the view-based access control model table;

when the identifier from the request is in the view-based access control model table:

identifying a management information base variable referenced in the request;

based on one or more MIB Views referenced in the view-based access control model table, determining whether a protocol operation of the request is allowed for the variable;

dispatching information identifying the variable and the protocol operation to a code implementation of the protocol operation only when the protocol operation is allowed for the variable.

7. A method as recited in claim 1, further comprising the steps of:

providing, at the network manager that is communicatively coupled to the network devices, a mapping of a plurality of virtual private network identifiers to SNMPv3 securityNames;

providing, at the network manager, an executable process that associates a virtual private network identifier with each SNMP request that is issued by the network management station to the network devices.

8. A method of controlling access of network management requests directed to one or more network devices that participate in a virtual private network, the method comprising the computer-implemented steps of:

receiving, from a network device participating in a virtual private network, a request to carry out a management protocol operation, wherein the request contains an identifier of the virtual private network in a security name value, wherein the identifier contained in the request is based on a mapping of securityName values to corresponding virtual private network identifiers that was agreed upon by two or more network devices participating in the virtual private network;

extracting the security name value, which identifies the virtual private network, and determining a protocol operation that is embodied in the request;

using a view-based access control model, matching the security name value, which identifies the virtual private network, to a management information base view that corresponds to the requested operation;

processing the requested operation only if access is allowed to managed objects, in the management information base, that are associated with one or more network devices participating in the virtual private network, based on the management information base view matching the security name value that identifies the virtual private network.

9. A method as recited in claim 8, further comprising the steps of:

determining whether the request can be satisfied;

extracting the security name value from a context string in the request.

10. A method as recited in claim 9, wherein the matching step further comprises the steps of:

determining whether the security name is in a view-based access control model table;

rejecting and returning the request when the security name is not found in the view-based access control model table.

11. A method as recited in claim 9, further comprising the steps of:

determining whether the security name is in a view-based access control model table;

when the security name is found in the view-based access control model table:

identifying a management information base variable referenced in the request;

based on one or more views referenced in the view-based access control model table, determining whether the protocol operation is allowed for the variable;

dispatching information identifying the variable and the protocol operation to a code implementation of the protocol operation only when the protocol operation is allowed for the variable.

12. The method as recited in claim 9, further comprising the steps of:

determining whether the security name is in a view-based access control model table;

when the security name is found in the view-based access control model table:

identifying a management information base variable referenced in the request;

based on one or more views referenced in the view-based access control model table, determining whether the protocol operation is allowed for the variable;

dispatching information identifying the variable and the protocol operation to a code implementation of the protocol operation only when the protocol operation is allowed for the variable;

determining whether a virtual private network identifier is referenced in the request, processing the request using managed information objects in a default view when no virtual private network identifier is referenced in the request, and processing the request using management information objects in a view corresponding to the virtual private network identifier only when a virtual private network identifier is referenced in the request.

13. A computer-readable medium carrying one or more sequences of instructions for controlling access of network management requests directed to one or more network devices that participate in a virtual private network, which instructions, when executed by one or more processors, cause the one or more processors to carry out the steps of:

a network manager and a managed network device agreeing on a first mapping between securityNames and virtual private network identifiers;

storing, at the network manager, a translation table containing the first mapping of securityName values to corresponding virtual private network identifiers;

storing, at a managed network device, a view-based access control model table containing a second mapping of securityName values to corresponding MIB (Management Information Base) Views;

receiving at the managed network device a request from the network manager, which is participating in a particular virtual private network, to carry out a management protocol operation that involves one or more managed objects associated with one or more network devices participating in the particular virtual private network;

wherein the request contains a particular securityName value that is mapped to the particular virtual private network identifier in the first mapping;

at the managed network device, extracting the particular securityName value from the request and identifying, based on the particular securityName value that is mapped in the second mapping, one or more corresponding particular MIB (Management Information Base) Views;

at the managed network device, identifying, based on the one or more corresponding particular MIB (Management Information Base) Views and from a plurality of managed objects, a subset of managed objects that requests associated with the particular virtual private network are permitted to access; and in response to the request, providing to the network manager access to only the subset of managed objects from the plurality of managed objects.

14. A computer-readable medium as recited in claim 13, further comprising instructions which, when executed by the one or more processors, cause the one or more processors to carry out the steps of providing, at the managed network device, the second mapping in the form of one or more entries in a view-based access control model table that associate SNMPv3 securityName values to corresponding MIB (Management Information Base) Views.

15. A computer-readable medium as recited in claim 13, further comprising instructions which, when executed by the one or more processors, cause the one or more processors to carry out the steps of providing, at the managed network device, one or more entries in a view-based access control model table that associate SNMPv3 securityName values to corresponding MIB (Management Information Base) Views, wherein each of the securityName values is associated with a virtual private network, and wherein the corresponding MIB Views represent access control policies applicable to the associated virtual private networks.

16. A computer-readable medium as recited in claim 13, further comprising instructions which, when executed by the one or more processors, cause the one or more processors to carry out the steps of providing, at the managed network device, the second mapping, and wherein the steps of identifying a subset of objects and providing access comprise the steps of:
   determining whether the securityName value from the request is in the second mapping;
   when the securityName value from the request is in the second mapping:
      identifying a management information base variable referenced in the request;
      based on one or more views referenced in the second mapping, determining whether a protocol operation of the request is allowed for the variable;
      dispatching information identifying the variable and the protocol operation to a code implementation of the protocol operation only when the protocol operation is allowed for the variable.

17. An apparatus for controlling access of network management requests directed to one or more network devices that participate in a virtual private network, comprising:
   means for a second managed network device agreeing with a first network device on a first mapping between securityNames and virtual private network identifiers;
   means for storing, at the second managed network device, a view-based access control model table containing a second mapping of securityName values to corresponding MIB (Management Information Base) Views;
   means for receiving at the second managed network device a request from the first network device, which is participating in a particular virtual private network, to carry out a management protocol operation that involves one or more managed objects associated with one or more network devices participating in the particular virtual private network;
   wherein the request contains a particular securityName value mapped, in the first mapping, to the particular virtual private network identifier, and wherein the first mapping is stored at the first network device;
   at the second managed network device, means for extracting the particular securityName value from the request and identifying, based on the particular securityName value that is mapped in the second mapping, one or more corresponding particular MIB (Management Information Base) Views;
   at the second managed network device, means for identifying, based on the one or more corresponding particular MIB (Management Information Base) Views and from a plurality of managed objects, a subset of managed objects that requests associated with the particular virtual private network are permitted to access; and
   means for providing to the first network device access to only the subset of managed objects from the plurality of managed objects.

18. The apparatus of claim 17, further comprising means for providing, at the managed network device, the second mapping in the form of one or more entries in a view-based access control model table that associate SNMPv3 securityName values to corresponding MIB (Management Information Base) Views.

19. The apparatus of claim 17, further comprising means for providing, at the managed network device, one or more entries in a view-based access control model table that associate SNMPv3 securityName values to corresponding MIB (Management Information Base) Views, wherein each of the securityName values is associated with a virtual private network, and wherein the corresponding MIB Views represent access control policies applicable to the associated virtual private networks.

20. The apparatus of claim 17, further comprising means for providing, at the managed network device, the second mapping, and wherein the means for identifying a subset of objects and providing access comprise:
   means for determining whether the securityName value from the request is in the second mapping;
   means for identifying a management information base variable referenced in the request when the securityName value from the request is in the second mapping;
   based on one or more views referenced in the second mapping, means for determining whether a protocol operation of the request is allowed for the variable when the securityName value from the request is in the second mapping;
   means for dispatching information identifying the variable and the protocol operation to a code implementation of the protocol operation only when the protocol operation is allowed for the variable when the securityName value from the request is in the second mapping.

21. The apparatus of claim 17, further comprising means for providing, at the managed network device, the second mapping in the form of one or more entries in a view-based access control model table that associate security name values to corresponding MIB (Management Information Base) Views, and wherein the means for identifying a subset of objects and providing access comprise:
   means for determining whether the securityName value from the request is in the view-based access control model table;
   means for identifying a management information base variable referenced in the request when the securityName value from the request is in the view-based access control model table;
   based on one or more MIB Views referenced in the view-based access control model table, means for determining whether a protocol operation of the request is allowed for the variable when the securityName value from the request is in the view-based access control model table;

means for dispatching information identifying the variable and the protocol operation to a code implementation of the protocol operation only when the protocol operation is allowed for the variable when the securityName value from the request is in the view-based access control model table.

22. The apparatus of claim 17, further comprising means for providing, at the managed network device, one or more entries in a view-based access control model table that associate SNMPv3 securityName values to corresponding MIB (Management Information Base) Views, wherein each of the securityName values is associated with a virtual private network, and wherein the corresponding MIB Views represent access control policies applicable to the associated virtual private networks, and wherein the means for identifying a subset of objects and providing the request with access comprise:

means for determining whether the securityName value from the request is in the view-based access control model table;

means for identifying a management information base variable referenced in the request when the identifier from the request is in the view-based access control model table;

based on one or more MIB Views referenced in the view-based access control model table, means for determining whether a protocol operation of the request is allowed for the variable when the identifier from the request is in the view-based access control model table;

means for dispatching information identifying the variable and the protocol operation to a code implementation of the protocol operation only when the protocol operation is allowed for the variable when the identifier from the request is in the view-based access control model table.

23. The apparatus of claim 17, further comprising:

means for providing, at the network manager that is communicatively coupled to the network devices, a mapping of a plurality of virtual private network identifiers to SNMPv3 securityNames;

means for providing, at the network manager, an executable process that associates a virtual private network identifier with each SNMP request that is issued by the network management station to the network devices.

24. An apparatus controlling access of network management requests directed to one or more network devices that participate in a virtual private network, comprising:

a network interface that is coupled to the data network for receiving one or more packet flows therefrom;

a processor;

one or more stored sequences of instructions which, when executed by the processor, cause the processor to carry out the steps of:

a second managed network device agreeing with a first network device on a first mapping between securityNames and virtual private network identifiers;

storing, at the second managed network device, a view-based access control model table containing a second mapping of securityName values to corresponding MIB (Management Information Base) Views;

receiving at the second managed network device a request from the first network device, which is participating in a particular virtual private network, to carry out a management protocol operation that involves one or more managed objects associated with one or more network devices participating in the particular virtual private network;

wherein the request contains a particular securityName value mapped, in the first mapping, to the particular virtual private network identifier, and wherein the first mapping is stored at the first network device;

at the second managed network device, extracting the particular securityName value from the request and identifying, based on the particular securityName value that is mapped in the second mapping, one or more corresponding particular MIB (Management Information Base) Views;

at the second managed network device, identifying, based on the one or more corresponding particular MIB (Management Information Base) Views and from a plurality of managed objects, a subset of managed objects that requests associated with the particular virtual private network are permitted to access; and providing to the first network device access to only the subset of managed objects from the plurality of managed objects.

25. The apparatus of claim 24, wherein the one or more stored sequences of instructions which, when executed by the processor, cause the processor to carry out the step of providing, at the managed network device, the second mapping in the form of one or more entries in a view-based access control model table that associate SNMPv3 securityName values to corresponding MIB (Management Information Base) Views.

26. The apparatus of claim 24, wherein the one or more stored sequences of instructions which, when executed by the processor, cause the processor to carry out the step of providing, at the managed network device, one or more entries in a view-based access control model table that associate SNMPv3 securityName values to corresponding MIB (Management Information Base) Views, wherein each of the securityName values is associated with a virtual private network, and wherein the corresponding MIB Views represent access control policies applicable to the associated virtual private networks.

27. The apparatus of claim 24, wherein the one or more stored sequences of instructions which, when executed by the processor, cause the processor to carry out the step of providing, at the managed network device, the second mapping, and wherein the steps identifying a subset of objects and providing access comprise:

determining whether the securityName value from the request is in the second mapping;

when the securityName value from the request is in the second mapping:

identifying a management information base variable referenced in the request;

based on one or more views referenced in the second mapping, determining whether a protocol operation of the request is allowed for the variable;

dispatching information identifying the variable and the protocol operation to a code implementation of the protocol operation only when the protocol operation is allowed for the variable.

28. The apparatus of claim 24, wherein the one or more stored sequences of instructions which, when executed by the processor, cause the processor to carry out the step of providing, at the managed network device, the second mapping in the form of one or more entries in a view-based access control model table that associate security name values to corresponding MIB (Management Information Base) Views, and wherein the steps of identifying a subset of objects and providing access comprise:

determining whether the securityName value from the request is in the view-based access control model table;

when the securityName value from the request is in the second mapping:

identifying a management information base variable referenced in the request;

based on one or more MIB Views referenced in the view-based access control model table, determining whether a protocol operation of the request is allowed for the variable;

dispatching information identifying the variable and the protocol operation to a code implementation of the protocol operation only when the protocol operation is allowed for the variable.

29. The apparatus of claim 24, wherein the one or more stored sequences of instructions which, when executed by the processor, cause the processor to carry out the step of providing, at the managed network device, one or more entries in a view-based access control model table that associate SNMPv3 securityName values to corresponding MIB (Management Information Base) Views, wherein each of the securityName values is associated with a virtual private network, and wherein the corresponding MIB Views represent access control policies applicable to the associated virtual private networks, and wherein the steps of identifying a subset of objects and providing the request with access comprise:

determining whether the securityName value from the request is in the view-based access control model table;

when the identifier from the request is in the view-based access control model table:

identifying a management information base variable referenced in the request;

based on one or more MIB Views referenced in the view-based access control model table, determining whether a protocol operation of the request is allowed for the variable;

dispatching information identifying the variable and the protocol operation to a code implementation of the protocol operation only when the protocol operation is allowed for the variable.

30. The apparatus of claim 24, wherein the one or more stored sequences of instructions which, when executed by the processor, cause the processor to carry out the steps of:

providing, at the network manager that is communicatively coupled to the network devices, a mapping of a plurality of virtual private network identifiers to SNMPv3 securityNames;

providing, at the network manager, an executable process that associates a virtual private network identifier with each SNMP request that is issued by the network management station to the network devices.

\* \* \* \* \*